United States Patent
Hart et al.

(10) Patent No.: US 12,190,702 B2
(45) Date of Patent: Jan. 7, 2025

(54) SYSTEMS AND METHODS FOR PROVISIONING APPLIANCE DEVICES IN RESPONSE TO A PANIC SIGNAL

(71) Applicant: Ooma, Inc., Sunnyvale, CA (US)

(72) Inventors: Douglas E. Hart, San Jose, CA (US); Tobin E. Farrand, Pacific Grove, CA (US); David A. Bryan, Cedar Park, TX (US)

(73) Assignee: Ooma, Inc., Sunnyvale, CA (US)

( * ) Notice: Subject to any disclaimer, the term of this patent is extended or adjusted under 35 U.S.C. 154(b) by 522 days.

(21) Appl. No.: 17/523,697

(22) Filed: Nov. 10, 2021

(65) Prior Publication Data

US 2022/0068110 A1  Mar. 3, 2022

Related U.S. Application Data

(63) Continuation of application No. 16/776,466, filed on Jan. 29, 2020, now Pat. No. 11,315,405, which is a continuation of application No. 14/327,163, filed on Jul. 9, 2014, now Pat. No. 10,553,098.

(51) Int. Cl.
  *G08B 21/04* (2006.01)
  *G08B 21/18* (2006.01)
  *G08B 25/00* (2006.01)
  *G08B 25/01* (2006.01)

(52) U.S. Cl.
  CPC .......... *G08B 21/18* (2013.01); *G08B 21/043* (2013.01); *G08B 25/001* (2013.01); *G08B 21/0461* (2013.01); *G08B 25/016* (2013.01)

(58) Field of Classification Search
  CPC .... G08B 21/18; G08B 21/043; G08B 25/001; G08B 21/0461; G08B 25/016; H04W 4/90
  See application file for complete search history.

(56) References Cited

U.S. PATENT DOCUMENTS

| | | | |
|---|---|---|---|
| 5,323,444 | A | 6/1994 | Ertz et al. |
| 5,425,085 | A | 6/1995 | Weinberger et al. |
| 5,463,595 | A | 10/1995 | Rodhall et al. |
| 5,519,769 | A | 5/1996 | Weinberger et al. |
| 5,596,625 | A | 1/1997 | LeBlanc |
| 5,598,460 | A | 1/1997 | Tendler |

(Continued)

FOREIGN PATENT DOCUMENTS

| | | |
|---|---|---|
| CA | 2949211 C | 2/2019 |
| CA | 2954351 C | 4/2020 |

(Continued)

OTHER PUBLICATIONS

"International Search Report" and "Written Opinion of the International Searching Authority," Patent Cooperation Treaty Application No. PCT/US2014/044945, Nov. 7, 2014, 12 pages.

(Continued)

*Primary Examiner* — Marcos L Torres
(74) *Attorney, Agent, or Firm* — Carr & Ferrell LLP

(57) ABSTRACT

Systems, methods, and software for allowing interaction between consumer appliance devices and security systems are provided herein. An exemplary method may include allowing various interactions of a user with a consumer appliance device to generate a signal, such as a panic signal, causing various forms of security systems to escalate the signal to obtain help.

18 Claims, 8 Drawing Sheets

(56) References Cited

U.S. PATENT DOCUMENTS

| | | |
|---|---|---|
| 5,796,736 A | 8/1998 | Suzuki |
| 5,999,611 A | 12/1999 | Tatchell et al. |
| 6,023,724 A | 2/2000 | Bhatia et al. |
| 6,128,481 A | 10/2000 | Houde et al. |
| 6,148,190 A | 11/2000 | Bugnon et al. |
| 6,201,856 B1 | 3/2001 | Orwick et al. |
| 6,202,169 B1 | 3/2001 | Razzaghe-Ashrafi et al. |
| 6,266,397 B1 | 7/2001 | Stoner |
| 6,377,938 B1 | 4/2002 | Block et al. |
| 6,487,197 B1 | 11/2002 | Elliott |
| 6,594,246 B1 | 7/2003 | Jorgensen |
| 6,615,264 B1 | 9/2003 | Stoltz et al. |
| 6,661,340 B1 | 12/2003 | Saylor et al. |
| 6,690,932 B1 | 2/2004 | Barnier et al. |
| 6,697,358 B2 | 2/2004 | Bernstein |
| 6,714,545 B1 | 3/2004 | Hugenberg et al. |
| 6,757,362 B1 | 6/2004 | Cooper et al. |
| 6,775,267 B1 | 8/2004 | Kung et al. |
| 6,778,517 B1 | 8/2004 | Lou et al. |
| 6,778,528 B1 | 8/2004 | Blair et al. |
| 6,781,983 B1 | 8/2004 | Armistead |
| 6,799,031 B1 | 9/2004 | Lewiner et al. |
| 6,914,900 B1 | 7/2005 | Komatsu et al. |
| 6,934,258 B1 | 8/2005 | Smith et al. |
| 7,113,090 B1 | 9/2006 | Saylor et al. |
| 7,124,506 B2 | 10/2006 | Yamanashi et al. |
| 7,127,043 B2 | 10/2006 | Morris |
| 7,127,506 B1 | 10/2006 | Schmidt et al. |
| 7,154,891 B1 | 12/2006 | Callon |
| 7,280,495 B1 | 10/2007 | Zweig et al. |
| 7,295,660 B1 | 11/2007 | Higginbotham et al. |
| 7,336,172 B2 | 2/2008 | Govindraj |
| 7,342,925 B2 | 3/2008 | Cherchali et al. |
| 7,376,124 B2 | 5/2008 | Lee et al. |
| 7,394,803 B1 | 7/2008 | Petit-Huguenin et al. |
| 7,599,356 B1 | 10/2009 | Barzegar et al. |
| 7,733,859 B2 | 6/2010 | Takahashi et al. |
| 7,844,034 B1 | 11/2010 | Oh et al. |
| 7,969,296 B1 | 6/2011 | Stell |
| 8,098,798 B2 | 1/2012 | Goldman et al. |
| 8,140,392 B2 | 3/2012 | Altberg et al. |
| 8,180,316 B2 | 5/2012 | Hwang |
| 8,208,955 B1 | 6/2012 | Nelson |
| 8,331,547 B2 | 12/2012 | Smith et al. |
| 8,350,694 B1 | 1/2013 | Trundle et al. |
| 8,515,021 B2 | 8/2013 | Farrand et al. |
| 8,577,000 B1 | 11/2013 | Brown |
| 8,634,520 B1 | 1/2014 | Morrison et al. |
| 8,837,698 B2 | 9/2014 | Altberg et al. |
| 8,988,232 B1 | 3/2015 | Sloo et al. |
| 9,080,782 B1 | 7/2015 | Sheikh |
| 9,087,515 B2 | 7/2015 | Tsuda |
| 9,119,236 B1 | 8/2015 | Martin |
| 9,147,054 B1 | 9/2015 | Beal et al. |
| 9,179,279 B2 | 11/2015 | Zussman |
| 9,225,626 B2 | 12/2015 | Capper et al. |
| 9,237,228 B2 * | 1/2016 | Zhu .................. H04M 7/006 |
| 9,386,148 B2 | 7/2016 | Farrand et al. |
| 9,386,414 B1 | 7/2016 | Mayor et al. |
| 9,418,658 B1 | 8/2016 | David |
| 9,426,288 B2 | 8/2016 | Farrand et al. |
| 9,521,069 B2 | 12/2016 | Gillon et al. |
| 9,560,198 B2 | 1/2017 | Farrand et al. |
| 9,633,547 B2 | 4/2017 | Farrand et al. |
| 9,667,782 B2 | 5/2017 | Farrand et al. |
| 9,697,828 B1 | 7/2017 | Prasad et al. |
| 9,786,145 B2 | 10/2017 | Oppenheimer |
| 9,787,611 B2 | 10/2017 | Gillon et al. |
| 9,826,372 B2 | 11/2017 | Jeong |
| 9,905,103 B2 | 2/2018 | Hsieh |
| 9,929,981 B2 | 3/2018 | Gillon et al. |
| 10,009,286 B2 | 6/2018 | Gillon et al. |
| 10,074,371 B1 | 9/2018 | Wang et al. |
| 10,116,796 B2 | 10/2018 | Im et al. |
| 10,135,976 B2 | 11/2018 | Farrand et al. |
| 10,158,584 B2 | 12/2018 | Gillon et al. |
| 10,192,546 B1 | 1/2019 | Piersol et al. |
| 10,255,792 B2 | 4/2019 | Farrand et al. |
| 10,263,918 B2 | 4/2019 | Gillon et al. |
| 10,297,250 B1 | 5/2019 | Blanksteen et al. |
| 10,341,490 B2 | 7/2019 | Im et al. |
| 10,469,556 B2 | 11/2019 | Frame et al. |
| 10,553,098 B2 | 2/2020 | Hart et al. |
| 10,580,405 B1 | 3/2020 | Wang et al. |
| 10,593,328 B1 | 3/2020 | Wang et al. |
| 10,706,703 B1 | 7/2020 | Barr |
| 10,714,081 B1 | 7/2020 | Miller |
| 10,728,386 B2 | 7/2020 | Farrand et al. |
| 10,769,931 B2 | 9/2020 | Krein et al. |
| 10,771,396 B2 | 9/2020 | Osterlund et al. |
| 10,818,158 B2 | 10/2020 | Farrand et al. |
| 10,854,199 B2 | 12/2020 | Hanes |
| 10,887,764 B1 | 1/2021 | Mokady |
| 10,911,368 B2 | 2/2021 | Gillon et al. |
| 11,032,211 B2 | 6/2021 | Gillon |
| 11,069,353 B1 | 7/2021 | Gao et al. |
| 11,070,644 B1 | 7/2021 | Teng et al. |
| 11,070,676 B2 | 7/2021 | Klingler et al. |
| 11,094,185 B2 | 8/2021 | Farrand et al. |
| 11,138,384 B2 | 10/2021 | Millius et al. |
| 11,145,203 B2 | 10/2021 | Noy et al. |
| 11,145,294 B2 | 10/2021 | Vescovi et al. |
| 11,151,862 B2 | 10/2021 | Farrand et al. |
| 11,159,767 B1 | 10/2021 | Kamisetty et al. |
| 11,171,875 B2 | 11/2021 | Osterlund et al. |
| 11,176,940 B1 | 11/2021 | Zhong et al. |
| 11,250,687 B2 | 2/2022 | Krein et al. |
| 11,315,405 B2 | 4/2022 | Hart et al. |
| 11,316,974 B2 | 4/2022 | White et al. |
| 11,330,100 B2 | 5/2022 | White et al. |
| 11,495,117 B2 | 11/2022 | Farrand et al. |
| 11,763,663 B2 | 9/2023 | Farrand et al. |
| 2001/0024163 A1 | 9/2001 | Petite |
| 2001/0025349 A1 | 9/2001 | Sharood et al. |
| 2001/0053194 A1 | 12/2001 | Johnson |
| 2002/0016718 A1 | 2/2002 | Rothschild et al. |
| 2002/0035556 A1 | 3/2002 | Shah et al. |
| 2002/0037750 A1 | 3/2002 | Hussain et al. |
| 2002/0038167 A1 | 3/2002 | Chirnomas |
| 2002/0057764 A1 | 5/2002 | Salvucci et al. |
| 2002/0085692 A1 | 7/2002 | Katz |
| 2002/0130784 A1 | 9/2002 | Suzuki et al. |
| 2002/0133614 A1 | 9/2002 | Weerahandi et al. |
| 2002/0140549 A1 | 10/2002 | Tseng |
| 2002/0165966 A1 | 11/2002 | Widegren et al. |
| 2003/0027602 A1 | 2/2003 | Han et al. |
| 2003/0058844 A1 | 3/2003 | Sojka et al. |
| 2003/0099334 A1 | 5/2003 | Contractor |
| 2003/0119492 A1 | 6/2003 | Timmins et al. |
| 2003/0133443 A1 | 7/2003 | Klinker et al. |
| 2003/0141093 A1 | 7/2003 | Tirosh et al. |
| 2003/0158940 A1 | 8/2003 | Leigh |
| 2003/0164877 A1 | 9/2003 | Murai |
| 2003/0184436 A1 | 10/2003 | Seales et al. |
| 2003/0189928 A1 | 10/2003 | Xiong |
| 2003/0193393 A1 | 10/2003 | Ford |
| 2004/0001512 A1 | 1/2004 | Challener et al. |
| 2004/0010472 A1 | 1/2004 | Hilby et al. |
| 2004/0010569 A1 | 1/2004 | Thomas et al. |
| 2004/0017803 A1 | 1/2004 | Lim et al. |
| 2004/0059821 A1 | 3/2004 | Tang et al. |
| 2004/0062373 A1 | 4/2004 | Baker |
| 2004/0086093 A1 | 5/2004 | Schranz |
| 2004/0090968 A1 | 5/2004 | Kimber et al. |
| 2004/0105444 A1 | 6/2004 | Korotin et al. |
| 2004/0160956 A1 | 8/2004 | Hardy et al. |
| 2004/0235509 A1 | 11/2004 | Burritt et al. |
| 2004/0267385 A1 | 12/2004 | Lingemann |
| 2005/0027887 A1 | 2/2005 | Zimler et al. |
| 2005/0036590 A1 | 2/2005 | Pearson et al. |
| 2005/0053209 A1 | 3/2005 | D'Evelyn et al. |
| 2005/0074114 A1 | 4/2005 | Fotta et al. |
| 2005/0078681 A1 | 4/2005 | Sanuki et al. |
| 2005/0089018 A1 | 4/2005 | Schessel |

(56) References Cited

U.S. PATENT DOCUMENTS

| | | |
|---|---|---|
| 2005/0097222 A1 | 5/2005 | Jiang et al. |
| 2005/0105708 A1 | 5/2005 | Kouchri et al. |
| 2005/0141485 A1 | 6/2005 | Miyajima et al. |
| 2005/0169247 A1 | 8/2005 | Chen |
| 2005/0180549 A1 | 8/2005 | Chiu et al. |
| 2005/0222820 A1 | 10/2005 | Chung |
| 2005/0238034 A1 | 10/2005 | Gillespie et al. |
| 2005/0238142 A1 | 10/2005 | Winegarden |
| 2005/0246174 A1 | 11/2005 | DeGolia |
| 2005/0259637 A1 | 11/2005 | Chu et al. |
| 2005/0282518 A1 | 12/2005 | D'Evelyn et al. |
| 2005/0287979 A1 | 12/2005 | Rollender |
| 2006/0007915 A1 | 1/2006 | Frame |
| 2006/0009240 A1 | 1/2006 | Katz |
| 2006/0013195 A1 | 1/2006 | Son et al. |
| 2006/0052918 A1 | 3/2006 | McLeod et al. |
| 2006/0059238 A1 | 3/2006 | Slater et al. |
| 2006/0071775 A1 | 4/2006 | Otto et al. |
| 2006/0092011 A1 | 5/2006 | Simon et al. |
| 2006/0114894 A1 | 6/2006 | Cherchali et al. |
| 2006/0140352 A1 | 6/2006 | Morris |
| 2006/0156251 A1 | 7/2006 | Suhail et al. |
| 2006/0167746 A1 | 7/2006 | Zucker |
| 2006/0187898 A1 | 8/2006 | Chou et al. |
| 2006/0187900 A1 | 8/2006 | Akbar et al. |
| 2006/0206933 A1 | 9/2006 | Molen et al. |
| 2006/0243797 A1 | 11/2006 | Apte et al. |
| 2006/0251048 A1 | 11/2006 | Yoshino et al. |
| 2006/0258341 A1 | 11/2006 | Miller et al. |
| 2006/0259767 A1 | 11/2006 | Mansz et al. |
| 2006/0268828 A1 | 11/2006 | Yarlagadda |
| 2006/0268848 A1 | 11/2006 | Larsson et al. |
| 2007/0030161 A1 | 2/2007 | Yang |
| 2007/0032220 A1 | 2/2007 | Feher |
| 2007/0036314 A1 | 2/2007 | Kloberdans et al. |
| 2007/0037560 A1 | 2/2007 | Yun et al. |
| 2007/0037605 A1 | 2/2007 | Logan |
| 2007/0041517 A1 | 2/2007 | Clarke et al. |
| 2007/0049342 A1 | 3/2007 | Mayer et al. |
| 2007/0054645 A1 | 3/2007 | Pan |
| 2007/0061363 A1 | 3/2007 | Ramer et al. |
| 2007/0061735 A1 | 3/2007 | Hoffberg et al. |
| 2007/0067219 A1 | 3/2007 | Altberg et al. |
| 2007/0071212 A1 | 3/2007 | Quittek et al. |
| 2007/0118750 A1 | 5/2007 | Owen et al. |
| 2007/0121593 A1 | 5/2007 | Vance et al. |
| 2007/0121596 A1 | 5/2007 | Kurapati et al. |
| 2007/0132844 A1 | 6/2007 | Katz |
| 2007/0133757 A1 | 6/2007 | Girouard et al. |
| 2007/0135088 A1 | 6/2007 | Alessandro |
| 2007/0153776 A1 | 7/2007 | Joseph et al. |
| 2007/0165811 A1 | 7/2007 | Reumann et al. |
| 2007/0183407 A1 | 8/2007 | Bennett et al. |
| 2007/0203999 A1 | 8/2007 | Townsley et al. |
| 2007/0220907 A1 | 9/2007 | Ehlers |
| 2007/0223455 A1 | 9/2007 | Chang et al. |
| 2007/0238472 A1 | 10/2007 | Wanless |
| 2007/0255702 A1 | 11/2007 | Orme |
| 2007/0283430 A1 | 12/2007 | Lai et al. |
| 2007/0298772 A1 | 12/2007 | Owens et al. |
| 2008/0016556 A1 | 1/2008 | Selignan |
| 2008/0036585 A1 | 2/2008 | Gould |
| 2008/0049748 A1 | 2/2008 | Bugenhagen et al. |
| 2008/0075248 A1 | 3/2008 | Kim |
| 2008/0075257 A1 | 3/2008 | Nguyen et al. |
| 2008/0084975 A1 | 4/2008 | Schwartz |
| 2008/0089325 A1 | 4/2008 | Sung |
| 2008/0097819 A1 | 4/2008 | Whitman, Jr. |
| 2008/0101338 A1 | 5/2008 | Reynolds et al. |
| 2008/0101378 A1 | 5/2008 | Krueger |
| 2008/0111765 A1 | 5/2008 | Kim |
| 2008/0118039 A1 | 5/2008 | Elliot et al. |
| 2008/0125095 A1 | 5/2008 | Mornhineway et al. |
| 2008/0125964 A1 | 5/2008 | Carani et al. |
| 2008/0144625 A1 | 6/2008 | Wu et al. |
| 2008/0144884 A1 | 6/2008 | Habibi |
| 2008/0159515 A1 | 7/2008 | Rines |
| 2008/0166992 A1 | 7/2008 | Ricordi et al. |
| 2008/0168145 A1 | 7/2008 | Wilson |
| 2008/0196099 A1 | 8/2008 | Shastri |
| 2008/0200142 A1 | 8/2008 | Abdel-Kader et al. |
| 2008/0205386 A1 | 8/2008 | Purnadi et al. |
| 2008/0225749 A1 | 9/2008 | Peng et al. |
| 2008/0247401 A1 | 10/2008 | Bhal et al. |
| 2008/0293374 A1 | 11/2008 | Berger |
| 2008/0298348 A1 | 12/2008 | Frame et al. |
| 2008/0309486 A1 | 12/2008 | McKenna et al. |
| 2008/0310599 A1 | 12/2008 | Purnadi et al. |
| 2008/0313297 A1 | 12/2008 | Heron et al. |
| 2008/0316946 A1 | 12/2008 | Capper et al. |
| 2009/0026280 A1 | 1/2009 | Liao et al. |
| 2009/0097474 A1 | 4/2009 | Ray et al. |
| 2009/0106318 A1 | 4/2009 | Mantripragada et al. |
| 2009/0135008 A1 | 5/2009 | Kirchmeier et al. |
| 2009/0140060 A1 | 6/2009 | Stoner et al. |
| 2009/0168755 A1 | 7/2009 | Peng et al. |
| 2009/0171659 A1 | 7/2009 | Pearce |
| 2009/0172131 A1 | 7/2009 | Sullivan |
| 2009/0175165 A1 | 7/2009 | Leighton |
| 2009/0186596 A1 | 7/2009 | Kaltsukis |
| 2009/0213999 A1 | 8/2009 | Farrand et al. |
| 2009/0224931 A1 | 9/2009 | Dietz et al. |
| 2009/0240586 A1 | 9/2009 | Ramer et al. |
| 2009/0253428 A1 | 10/2009 | Bhatia et al. |
| 2009/0261958 A1 | 10/2009 | Sundararajan et al. |
| 2009/0264093 A1 | 10/2009 | Rothschild |
| 2009/0289757 A1 | 11/2009 | Ballard |
| 2009/0295572 A1 | 12/2009 | Grim, III et al. |
| 2009/0303042 A1 | 12/2009 | Song et al. |
| 2009/0319271 A1 | 12/2009 | Gross |
| 2010/0003960 A1 | 1/2010 | Ray et al. |
| 2010/0034121 A1 | 2/2010 | Bozionek |
| 2010/0046530 A1 | 2/2010 | Hautakorpi et al. |
| 2010/0046731 A1 | 2/2010 | Gisby et al. |
| 2010/0077063 A1 | 3/2010 | Amit et al. |
| 2010/0098034 A1 | 4/2010 | Tang et al. |
| 2010/0098058 A1 | 4/2010 | Delangis |
| 2010/0098235 A1 | 4/2010 | Cadiz et al. |
| 2010/0114896 A1 | 5/2010 | Clark et al. |
| 2010/0127850 A1 | 5/2010 | Poder et al. |
| 2010/0136982 A1 | 6/2010 | Zabawskyj et al. |
| 2010/0158223 A1 | 6/2010 | Fang et al. |
| 2010/0191829 A1 | 7/2010 | Cagenius |
| 2010/0195805 A1 | 8/2010 | Zeigler et al. |
| 2010/0215153 A1 | 8/2010 | Ray et al. |
| 2010/0220840 A1 | 9/2010 | Ray et al. |
| 2010/0229452 A1 | 9/2010 | Suk |
| 2010/0246781 A1 | 9/2010 | Bradburn |
| 2010/0261448 A1 | 10/2010 | Peters |
| 2010/0277307 A1 | 11/2010 | Horton et al. |
| 2010/0302025 A1 | 12/2010 | Script |
| 2011/0013591 A1 | 1/2011 | Kakumaru |
| 2011/0047031 A1 | 2/2011 | Weerasinghe |
| 2011/0054689 A1 | 3/2011 | Nielsen et al. |
| 2011/0090334 A1 | 4/2011 | Hicks, III |
| 2011/0111728 A1 | 5/2011 | Ferguson et al. |
| 2011/0140868 A1 | 6/2011 | Hovang |
| 2011/0151791 A1 | 6/2011 | Snider et al. |
| 2011/0151829 A1 | 6/2011 | Velusamy et al. |
| 2011/0170680 A1 | 7/2011 | Chislett et al. |
| 2011/0183652 A1 | 7/2011 | Eng et al. |
| 2011/0202594 A1 | 8/2011 | Ricci |
| 2011/0208822 A1 | 8/2011 | Rathod |
| 2011/0265145 A1 | 10/2011 | Prasad et al. |
| 2011/0286462 A1 | 11/2011 | Kompella |
| 2011/0320274 A1 | 12/2011 | Patil |
| 2012/0009904 A1 | 1/2012 | Modi et al. |
| 2012/0010955 A1 | 1/2012 | Ramer et al. |
| 2012/0027191 A1 | 2/2012 | Baril et al. |
| 2012/0035993 A1 | 2/2012 | Nangia |
| 2012/0036576 A1 | 2/2012 | Iyer |
| 2012/0047442 A1 | 2/2012 | Nicolaou et al. |
| 2012/0092158 A1 | 4/2012 | Kumbhar et al. |
| 2012/0092171 A1 | 4/2012 | Hwang et al. |

(56) References Cited

U.S. PATENT DOCUMENTS

| | | |
|---|---|---|
| 2012/0099716 A1 | 4/2012 | Rae et al. |
| 2012/0116589 A1 | 5/2012 | Schneider et al. |
| 2012/0118169 A1 | 5/2012 | Hirano et al. |
| 2012/0166582 A1 | 6/2012 | Binder |
| 2012/0167086 A1 | 6/2012 | Lee |
| 2012/0177052 A1 | 7/2012 | Chen et al. |
| 2012/0178404 A1 | 7/2012 | Chin et al. |
| 2012/0180122 A1 | 7/2012 | Yan et al. |
| 2012/0213094 A1 | 8/2012 | Zhang et al. |
| 2012/0245944 A1 | 9/2012 | Gruber et al. |
| 2012/0265528 A1 | 10/2012 | Gruber et al. |
| 2012/0284778 A1 | 11/2012 | Chiou et al. |
| 2012/0320905 A1 | 12/2012 | Ilagan |
| 2012/0329420 A1 | 12/2012 | Zotti et al. |
| 2013/0018509 A1 | 1/2013 | Korus |
| 2013/0024197 A1 | 1/2013 | Jang et al. |
| 2013/0035774 A1 | 2/2013 | Warren et al. |
| 2013/0038800 A1 | 2/2013 | Yoo |
| 2013/0052982 A1 | 2/2013 | Rohde et al. |
| 2013/0053005 A1 | 2/2013 | Ramer et al. |
| 2013/0059560 A1 | 3/2013 | Ray et al. |
| 2013/0070928 A1 | 3/2013 | Ellis et al. |
| 2013/0111589 A1 | 5/2013 | Cho |
| 2013/0136241 A1 | 5/2013 | Dillon et al. |
| 2013/0154822 A1 | 6/2013 | Kumar et al. |
| 2013/0162160 A1 | 6/2013 | Ganton et al. |
| 2013/0162758 A1 | 6/2013 | Shin |
| 2013/0214925 A1 | 8/2013 | Weiss |
| 2013/0229282 A1 | 9/2013 | Brent |
| 2013/0267791 A1 | 10/2013 | Halperin et al. |
| 2013/0272219 A1 | 10/2013 | Singh et al. |
| 2013/0276084 A1 | 10/2013 | Canard et al. |
| 2013/0278492 A1 | 10/2013 | Stolarz |
| 2013/0288639 A1 | 10/2013 | Varsavsky Waisman-Diamond |
| 2013/0289994 A1 | 10/2013 | Newman |
| 2013/0293368 A1 | 11/2013 | Ottah et al. |
| 2013/0328697 A1 | 12/2013 | Lundy |
| 2013/0336174 A1 | 12/2013 | Rubin et al. |
| 2014/0011470 A1 | 1/2014 | D'Amato et al. |
| 2014/0022915 A1 | 1/2014 | Caron et al. |
| 2014/0038536 A1 | 2/2014 | Welnick et al. |
| 2014/0059066 A1 | 2/2014 | Koloskov |
| 2014/0066063 A1 | 3/2014 | Park |
| 2014/0084165 A1 | 3/2014 | Fadell et al. |
| 2014/0085093 A1 | 3/2014 | Mittleman et al. |
| 2014/0101082 A1 | 4/2014 | Matsuoka et al. |
| 2014/0309996 A1 | 4/2014 | Zhang |
| 2014/0120863 A1 | 5/2014 | Ferguson et al. |
| 2014/0129942 A1 | 5/2014 | Rathod |
| 2014/0156279 A1 | 6/2014 | Okamoto et al. |
| 2014/0167931 A1 | 6/2014 | Lee et al. |
| 2014/0169274 A1 | 6/2014 | Kweon et al. |
| 2014/0172953 A1 | 6/2014 | Blanksteen |
| 2014/0181865 A1 | 6/2014 | Koganei |
| 2014/0191682 A1 | 7/2014 | Pederson |
| 2014/0199946 A1 | 7/2014 | Flippo et al. |
| 2014/0201571 A1 | 7/2014 | Hosek et al. |
| 2014/0206279 A1 | 7/2014 | Immendorf et al. |
| 2014/0207929 A1 | 7/2014 | Hoshino et al. |
| 2014/0222436 A1 | 8/2014 | Binder et al. |
| 2014/0229184 A1 | 8/2014 | Shires |
| 2014/0244273 A1 | 8/2014 | Laroche |
| 2014/0253326 A1 | 9/2014 | Cho et al. |
| 2014/0265568 A1 | 9/2014 | Crafts et al. |
| 2014/0265920 A1 | 9/2014 | Pederson |
| 2014/0266600 A1 | 9/2014 | Alberth, Jr. et al. |
| 2014/0266699 A1 | 9/2014 | Poder et al. |
| 2014/0273912 A1 | 9/2014 | Peh et al. |
| 2014/0273979 A1 | 9/2014 | Van Os et al. |
| 2014/0280870 A1 | 9/2014 | Shrivastava et al. |
| 2014/0306802 A1 | 10/2014 | Hibbs, Jr. |
| 2014/0310075 A1 | 10/2014 | Ricci |
| 2014/0334645 A1 | 11/2014 | Yun et al. |
| 2014/0334653 A1 | 11/2014 | Luna et al. |
| 2014/0358666 A1 | 12/2014 | Baghaie et al. |
| 2014/0379341 A1 | 12/2014 | Seo et al. |
| 2015/0026580 A1 | 1/2015 | Kang |
| 2015/0065078 A1 | 3/2015 | Mejia et al. |
| 2015/0071450 A1 | 3/2015 | Boyden et al. |
| 2015/0082451 A1 | 3/2015 | Ciancio-Bunch |
| 2015/0086001 A1 | 3/2015 | Farrand et al. |
| 2015/0087280 A1 | 3/2015 | Farrand et al. |
| 2015/0088514 A1 | 3/2015 | Typrin |
| 2015/0089032 A1 | 3/2015 | Agarwal et al. |
| 2015/0100167 A1 | 4/2015 | Sloo et al. |
| 2015/0105911 A1 | 4/2015 | Slupik et al. |
| 2015/0117624 A1 | 4/2015 | Rosenshine |
| 2015/0138333 A1 | 5/2015 | DeVaul et al. |
| 2015/0145693 A1 | 5/2015 | Toriumi et al. |
| 2015/0149651 A1 | 5/2015 | Yasukawa et al. |
| 2015/0162006 A1 | 6/2015 | Kummer |
| 2015/0163642 A1 | 6/2015 | Bates et al. |
| 2015/0177114 A1 | 6/2015 | Kapoor et al. |
| 2015/0186156 A1 | 7/2015 | Brown |
| 2015/0186892 A1 | 7/2015 | Zhang |
| 2015/0192914 A1 | 7/2015 | Slupik |
| 2015/0200973 A1 | 7/2015 | Nolan |
| 2015/0221207 A1 | 8/2015 | Hagan |
| 2015/0229770 A1 | 8/2015 | Shuman et al. |
| 2015/0242932 A1 | 8/2015 | Beguin et al. |
| 2015/0244873 A1 | 8/2015 | Boyden et al. |
| 2015/0255071 A1 | 9/2015 | Chiba |
| 2015/0262435 A1 | 9/2015 | Delong et al. |
| 2015/0279365 A1 | 10/2015 | Sharifi |
| 2015/0281450 A1 | 10/2015 | Shapiro et al. |
| 2015/0302725 A1 | 10/2015 | Sager et al. |
| 2015/0325096 A1 | 11/2015 | Hatch |
| 2015/0327039 A1 | 11/2015 | Jain |
| 2015/0334227 A1 | 11/2015 | Whitten et al. |
| 2015/0339912 A1 | 11/2015 | Farrand et al. |
| 2015/0358795 A1 | 12/2015 | You et al. |
| 2015/0379562 A1 | 12/2015 | Spievak et al. |
| 2015/0381563 A1 | 12/2015 | Seo et al. |
| 2016/0006837 A1 | 1/2016 | Reynolds et al. |
| 2016/0007175 A1 | 1/2016 | Kadi et al. |
| 2016/0012702 A1 | 1/2016 | Hart et al. |
| 2016/0021506 A1 | 1/2016 | Bonge, Jr. |
| 2016/0036751 A1 | 2/2016 | Ban |
| 2016/0036962 A1 | 2/2016 | Rand |
| 2016/0066011 A1 | 3/2016 | Ro et al. |
| 2016/0078750 A1 | 3/2016 | King et al. |
| 2016/0105847 A1 | 4/2016 | Smith et al. |
| 2016/0117684 A1 | 4/2016 | Khor et al. |
| 2016/0142758 A1 | 5/2016 | Karp et al. |
| 2016/0150024 A1 | 5/2016 | White |
| 2016/0151603 A1 | 6/2016 | Shouldice et al. |
| 2016/0173693 A1 | 6/2016 | Spievak et al. |
| 2016/0196596 A1 | 7/2016 | Van Wie et al. |
| 2016/0219150 A1 | 7/2016 | Brown |
| 2016/0232774 A1 | 8/2016 | Noland et al. |
| 2016/0248847 A1 | 8/2016 | Saxena et al. |
| 2016/0260431 A1 | 9/2016 | Newendorp et al. |
| 2016/0260436 A1 | 9/2016 | Lemay et al. |
| 2016/0269882 A1 | 9/2016 | Balthasar et al. |
| 2016/0277573 A1 | 9/2016 | Farrand et al. |
| 2016/0300260 A1 | 10/2016 | Cigich et al. |
| 2016/0315909 A1 | 10/2016 | von Gravrock et al. |
| 2016/0323446 A1 | 11/2016 | Farrand et al. |
| 2016/0330069 A1 | 11/2016 | Nordmark et al. |
| 2016/0330108 A1 | 11/2016 | Gillon et al. |
| 2016/0330319 A1 | 11/2016 | Farrand et al. |
| 2016/0330770 A1 | 11/2016 | Lee et al. |
| 2016/0335677 A1 | 11/2016 | Aleksic |
| 2016/0373372 A1 | 12/2016 | Gillon et al. |
| 2017/0021802 A1 | 1/2017 | Mims |
| 2017/0024995 A1 | 1/2017 | Gu et al. |
| 2017/0034044 A1 | 2/2017 | Gillon et al. |
| 2017/0034045 A1 | 2/2017 | Gillon et al. |
| 2017/0034062 A1 | 2/2017 | Gillon et al. |
| 2017/0034081 A1 | 2/2017 | Gillon et al. |
| 2017/0084164 A1 | 3/2017 | Farrand et al. |
| 2017/0104875 A1 | 4/2017 | Im et al. |
| 2017/0186309 A1 | 6/2017 | Sager et al. |
| 2017/0188216 A1 | 6/2017 | Koskas et al. |

(56) References Cited

U.S. PATENT DOCUMENTS

| | | |
|---|---|---|
| 2017/0191695 A1 | 7/2017 | Bruhn et al. |
| 2017/0270569 A1 | 9/2017 | Altberg et al. |
| 2017/0272316 A1 | 9/2017 | Johnson et al. |
| 2017/0293301 A1 | 10/2017 | Myslinski |
| 2017/0339228 A1 | 11/2017 | Azgin et al. |
| 2018/0005125 A1 | 1/2018 | Fadell et al. |
| 2018/0013869 A1 | 1/2018 | Smelyansky |
| 2018/0025724 A1 | 1/2018 | Hunt et al. |
| 2018/0025733 A1 | 1/2018 | Qian et al. |
| 2018/0061213 A1 | 3/2018 | Morehead |
| 2018/0075540 A1 | 3/2018 | Bernard et al. |
| 2018/0082683 A1 | 3/2018 | Chen et al. |
| 2018/0152557 A1 | 5/2018 | White et al. |
| 2018/0182380 A1 | 6/2018 | Fritz et al. |
| 2018/0182389 A1 | 6/2018 | Devaraj et al. |
| 2018/0204569 A1 | 7/2018 | Nadkar et al. |
| 2018/0262441 A1 | 9/2018 | Gillon et al. |
| 2018/0302334 A1 | 10/2018 | Osterlund et al. |
| 2018/0324105 A1 | 11/2018 | Gillon et al. |
| 2018/0336449 A1 | 11/2018 | Adan |
| 2018/0343024 A1 | 11/2018 | Sahebhavaher |
| 2018/0365026 A1 | 12/2018 | Jernigan et al. |
| 2018/0365969 A1 | 12/2018 | Krein et al. |
| 2018/0375927 A1 | 12/2018 | Nozawa |
| 2019/0014024 A1 | 1/2019 | Koshy |
| 2019/0028587 A1 | 1/2019 | Unitt et al. |
| 2019/0044641 A1 | 2/2019 | Trundle et al. |
| 2019/0045058 A1 | 2/2019 | Im et al. |
| 2019/0052752 A1 | 2/2019 | Farrand et al. |
| 2019/0130911 A1 | 5/2019 | Hanes |
| 2019/0155566 A1 | 5/2019 | Dory |
| 2019/0190942 A1 | 6/2019 | Drummond et al. |
| 2019/0206227 A1 | 7/2019 | Farrand et al. |
| 2019/0214011 A1 | 7/2019 | Shin |
| 2019/0221209 A1 | 7/2019 | Bulpin |
| 2019/0222993 A1 | 7/2019 | Maheshwari et al. |
| 2019/0385435 A1 | 12/2019 | Farrand et al. |
| 2020/0004989 A1 | 1/2020 | Lockhart, III et al. |
| 2020/0074993 A1 | 3/2020 | Lee |
| 2020/0105082 A1 | 4/2020 | Joao |
| 2020/0126388 A1 | 4/2020 | Kranz |
| 2020/0143663 A1 | 5/2020 | Sol |
| 2020/0145313 A1 | 5/2020 | Raindel et al. |
| 2020/0168073 A1 | 5/2020 | Hart et al. |
| 2020/0186644 A1 | 6/2020 | White et al. |
| 2020/0211562 A1 | 7/2020 | Yamazaki |
| 2020/0219378 A1 | 7/2020 | Farrand et al. |
| 2020/0250957 A1 | 8/2020 | Krein et al. |
| 2020/0322283 A1 | 10/2020 | Osterlund et al. |
| 2020/0380851 A1 | 12/2020 | Farrand et al. |
| 2021/0288917 A1 | 9/2021 | Gillon et al. |
| 2021/0312790 A1 | 10/2021 | Farrand et al. |
| 2022/0172597 A1 | 6/2022 | Hart et al. |
| 2024/0378980 A1 | 11/2024 | Hart et al. |

FOREIGN PATENT DOCUMENTS

| | | |
|---|---|---|
| CA | 2924631 C | 10/2021 |
| EP | 2187574 A1 | 5/2010 |
| EP | 3050287 A1 | 8/2016 |
| EP | 3146516 A1 | 3/2017 |
| EP | 3167340 A1 | 5/2017 |
| EP | 3295620 A1 | 3/2018 |
| EP | 3050287 B1 | 12/2018 |
| EP | 3585011 A1 | 12/2019 |
| EP | 3585011 B1 | 4/2021 |
| EP | 3295620 B1 | 10/2021 |
| JP | 2007004772 A | 1/2007 |
| WO | WO1996037993 A1 | 11/1996 |
| WO | WO2014051632 A1 | 3/2014 |
| WO | WO2015041738 A1 | 3/2015 |
| WO | WO2015179120 A1 | 11/2015 |
| WO | WO2016007244 A1 | 1/2016 |
| WO | WO2016182796 A1 | 11/2016 |
| WO | WO2018044657 A1 | 3/2018 |

OTHER PUBLICATIONS

"International Search Report" and "Written Opinion of the International Searching Authority," Patent Cooperation Treaty Application No. PCT/US2015/029109, Jul. 27, 2015, 12 pages.

"International Search Report" and "Written Opinion of the International Searching Authority," Patent Cooperation Treaty Application No. PCT/US2015/034054, Nov. 2, 2015, 15 pages.

Life Alert. "Life Alert's Four Layers of Protection, First Layer of Protection: Protection at Home." https://web.archive.org/web/20121127094247/http://www.lifealert.net/products/homeprotection.html. [retrieved Oct. 13, 2015], 4 pages.

"International Search Report" and "Written Opinion of the International Searching Authority," Patent Cooperation Treaty Application No. PCT/US2016/030597, Jun. 30, 2016, 12 pages.

"Extended European Search Report," European Patent Application No. 14845956.3, Feb. 16, 2017, 8 pages.

"Office Action," Canadian Patent Application No. 2949211, Aug. 16, 2017, 4 pages.

"Office Action," Canadian Patent Application No. 2954351, Oct. 27, 2017, 3 pages.

"International Search Report" and "Written Opinion of the International Searching Authority," Patent Cooperation Treaty Application No. PCT/US2017/048284, Nov. 8, 2017, 8 pages.

"Extended European Search Report," European Patent Application No. 15796148.3, Jan. 8, 2018, 8 pages.

"Office Action," European Patent Application No. 14845956.3, Apr. 9, 2018, 4 pages.

"Extended European Search Report," European Patent Application No. 15818258.4, Feb. 26, 2018, 8 pages.

"Notice of Allowance," European Patent Application No. 14845956.3, Jul. 11, 2018, 7 pages.

"Notice of Allowance", Canadian Patent Application No. 2949211, Jul. 31, 2018, 1 page.

"Office Action," Canadian Patent Application No. 2954351, Aug. 22, 2018, 4 pages.

"Partial Supplementary European Search Report," European Patent Application No. 16793194.8, Nov. 19, 2018, 10 pages.

"Extended European Search Report," European Patent Application No. 16793194.8, Feb. 26, 2019, 9 pages.

"Notice of Allowance", Canadian Patent Application No. 2954351, Aug. 27, 2019, 1 page.

"Extended European Search Report," European Patent Application No. 19187593.9, Nov. 13, 2019, 8 pages.

Takahashi et al. "A Hybrid FEC Method Using Packet-Level Convolution and Reed-Solomon Codes," IEICE Transaction on Communications, Communications Society, vol. E89-B, No. 8, Aug. 1, 2006. pp. 2143-2151.

"Office Action," European Patent Application No. 15796148.3, Jan. 29, 2020, 6 pages.

"Office Action," European Patent Application No. 15818258.4, Jan. 31, 2020, 5 pages.

"Office Action," European Patent Application No. 16793194.8, Jun. 9, 2020, 4 pages.

"Office Action," Canadian Patent Application No. 2924631, Jul. 14, 2020, 5 pages.

Smarter Home Life: "Hello Bixby Samsung Launches 5th Virtual Assistant Platform, SmartThings-embedded Wi-Fi router," [online], [retrieved on Jun. 18, 2020], Retrieved from the Internet: <URL: https://smarterhomelife.com/everything/2017/3/30/hello-bixby-samsung-launches-5th-virtual-assistant-platform-smartthings-embedded-wi-fi-router>.

"Notice of Allowance", European Patent Application No. 15818258.4, Oct. 2, 2020, 7 pages.

"Notice of Allowance", European Patent Application No. 19187593.9, Oct. 27, 2020, 7 pages.

"Office Action", European Patent Application No. 15796148.3, Dec. 8, 2020, 4 pages.

Christensen et al., "Voice-enabled IT transformation The new voice technologies", IBM Systems Journal, vol. 46, No. 4, 2007, 13 pages.

(56) References Cited

OTHER PUBLICATIONS

Das et al., "An automated speech-language therapy tool with interactive virtual agent and peer-to-peer feedback", IEEE, 2017, 6 pages.
Iannizzotto et al., "A Vision and Speech Enabled, Customizable, Virtual Assistant for Smart Environments", IEEE, 2018, 7 pages.
"Increased usability with virtual assistants by storing original audio when confidence is below a threshold level", IP.com, Jan. 13, 2020, 3 pages.
Michaud, "Observations of a New Chatbot Drawing Conclusions from Early Interactions with Users", IEEE Computer Society, 2018, 8 pages.
Rogoff, "Voice activated GUI—the next user interface", IEEE, 2001, 4 pages.
Zhang et al., "Dangerous Skills Understanding and Mitigating Security Risks of Voice-Controlled Third-Party Functions on Virtual Personal Assistant Systems", IEEE Symposium on Security and Privacy, 2019, 16 pages.
"Office Action", European Patent Application No. 15818258.4, Feb. 10, 2021, 4 pages.
"Office Action", Canada Patent Application No. 3072813, Apr. 21, 2021, 3 pages.
"Notice of Allowance", Canada Patent Application No. 2924631, May 18, 2021, 1 page.
"Notice of Allowance", European Patent Application No. 16793194.8, May 28, 2021, 7 pages.
"Office Action", Canada Patent Application No. 3072813, Nov. 1, 2021, 4 pages.
"Office Action", Canada Patent Application No. 2985353, Apr. 6, 2022, 3 pages.
"Office Action," European Patent Application No. 15818258.4, Mar. 11, 2022, 6 pages.

\* cited by examiner

SYSTEMS AND METHODS FOR PROVISIONING APPLIANCE DEVICES IN RESPONSE TO A PANIC SIGNAL

CROSS-REFERENCE TO RELATED APPLICATIONS

This Application is a continuation application of U.S. patent application Ser. No. 16/776,466, filed Jan. 29, 2020, entitled "Systems and Methods for Provisioning Appliance Devices," which is a continuation application of U.S. patent application Ser. No. 14/327,163, filed Jul. 9, 2014, entitled "Appliance Device Integration with Alarm Systems," the disclosure of which are hereby incorporated by reference in their entirety. This Application is also related to U.S. patent application Ser. No. 14/283,132, filed May 20, 2014, now granted as U.S. Pat. No. 9,633,547 issued on Apr. 25, 2017, the disclosure of which is hereby incorporated by reference in its entirety.

BACKGROUND OF THE INVENTION

Field of the Invention

The present technology pertains to monitoring and control of appliances, and more specifically to monitoring and control of appliances using sensor data.

Description of Related Art

Consumer electronics, such as thermostats, smoke alarms, television remote controls, intercoms, and internet of things (IOT) devices are becoming prevalent in homes, but do not communicate with residential alarm systems. Commercial and residential alarm systems detect intrusions and hazardous conditions (e.g., fire) to prevent injury and property loss. Alarm systems generally include switches on doors and windows, motions detectors, and heat sensors, but their use and associated data are limited to the alarm system. Alarm systems optionally include panic buttons, which allow a user to initiate an alarm upon the touch of a button. However, the expense of installing panic buttons and their fixed locations have limited their adoption.

BRIEF SUMMARY OF THE INVENTION

In at least one embodiment, the present technology is directed to a method for intelligent control of an appliance device. The method may include receiving information from at least one sensor using a computer network, the at least one sensor associated with an alarm system, the alarm system associated with a structure; and operating the appliance device using the received information.

In at least one embodiment, the present technology is directed to a method for notifying first responders of an emergency situation at a structure. The method may include receiving from an appliance device a user input using a computer network; and contacting a user associated with the appliance device, the contacting including at least one of a short message service (SMS) text message, push notification, email, audio message, video message, push notification or similar network signaling method, and telephone call, the telephone call using at least one of plain old telephone service (POTS), T1, and Voice-over-Internet Protocol (VoIP).

In at least one embodiment, the present technology is directed to a method for provisioning an appliance device. The method may include receiving a service address from a user associated with an appliance device; validating the received service address; storing the validated service address; receiving a panic signal from the user using the appliance device after the validated service address is stored; providing the validated service address to an emergency telephone number service provider for provisioning; and transmitting the validated service address to a public safety access point (PSAP) associated with the validated service address, the transmitting in response to the provisioning being successful.

In at least one embodiment, the present technology is directed to a method for provisioning an appliance device. The method may include receiving a service address from a user associated with an appliance device; validating the received service address; storing the validated service address; receiving a panic signal from the user using the appliance device after the validated service address is stored; providing the validated service address to an emergency telephone number service provider for provisioning; and transmitting the validated service address to a national PSAP, the transmitting in response to the provisioning being unsuccessful.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
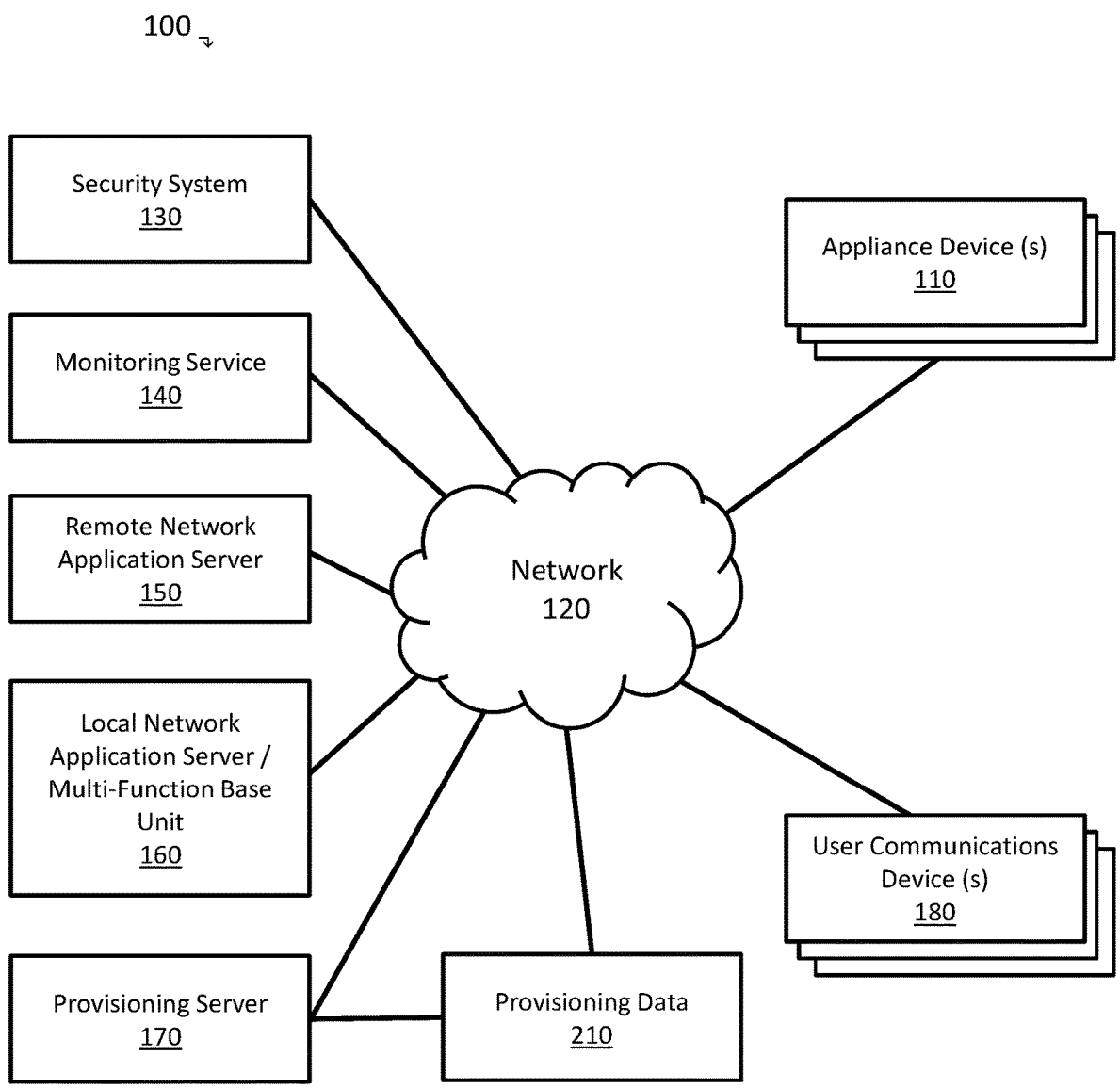
FIG. 1 is a simplified block diagram of a system, according to some embodiments of the present invention.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

According to various embodiments of the present invention, (home or consumer) appliance devices—such as thermostats, TV remote controls, light switches, electrical outlets, home theater systems, smoke detectors, carbon monoxide detectors, pool safety alarms, intercom devices, and the like—connect to local area networks (LANs) in a commercial or residential structure (e.g., home) through wireless and/or wired connections. The LAN connection, for example, enables appliance devices to be monitored and/or controlled from a central location, improving their function, providing additional capabilities, allowing them to coordinate actions with other appliances, and the like. Additionally, the LAN connection enables appliance devices to share information obtained by each device (e.g., through sensors or user input) with other devices. Such interconnection of appliance devices can make them easier to use for the end user. Integration of appliance devices with an alarm system, for example, offers opportunities to improve the performance and/or capabilities of the alarm system by incorporating appliance devices, and to improve the performance of appliance devices by access to capabilities of the alarm system.

In various embodiments, home security systems include a plurality of sensors that provide valuable information about the state of a structure (e.g., house). Sensors, for example, monitor if any doors or windows are opened or have been left open. Motion sensors, pressure sensors, vibration sensors, and/or sound sensors can detect the presence of individuals; magnetic sensors can detect the presence of vehicles at a residence; and smoke, water, and/or carbon monoxide detectors can monitor the environment for hazardous conditions. While the sensors conventionally provide information to the security system to determine if an intruder is present or another threat has arisen, the sensors in the present technology also provide valuable and useful information to home appliance devices, which can improve the appliance device's utility, usability, and/or performance.

Panic buttons may be a feature of home security systems. Panic buttons enable a user to initiate an alarm at the touch of a button, for example, requesting police, fire, or ambulance service, or indicating that an end user requires assistance in some other way. However, the expense of the panic button and its installation are impediments to its wide adoption, and the placement of the panic button in the home can be unsightly, inconvenient, or in a location that is not accessible when needed. Some embodiments provide an affordable method to embed the desirable function of the panic button into other appliance devices in the home (in addition to the devices' associated control applications), and increases the usefulness of both the appliance device and the security system. In addition, the utility of the panic button can be increased by using network connectivity and/or additional capabilities of the appliance device.

FIG. 1 illustrates system 100 (e.g., in a commercial or residential structure) for communication, data exchange, and use of the information that has been exchanged among at least appliance devices and security systems. The system of FIG. 1 includes an electronic device (appliance device) 110, by way of example and not limitation, a thermostat, remote control, intercom, light switch, door bell, telephone handset, video game system, garage door control system, environmental sensor incorporates some mechanism allowing a user to interact with that device to indicate a panic situation, and the like. The interaction mechanism may be associated with one or more appliance devices and may be in different forms. The interaction mechanism, for example, may be at least one of a dedicated button, "soft" or programmable button on a display, accelerometer (e.g., detecting shaking and/or striking), touch sensor, audio sensor (e.g., recognizing speech or a loud scream), switch conventionally provisioned for a different purpose (e.g., light switch), and the like that when operated in a particular way (e.g. clicking 3 times rapidly than holding down) initiates the interaction or some other response/action.

Appliance device 110 in the structure communicates wirelessly and/or through a wired connection with interconnect and/or network 120. Interconnect and/or network 120 may be one or more of a public computer network (e.g., the Internet), local computer network (e.g., LAN), a wireless computer network (e.g., WiFi), a wired computer network, and the like; other network technology (e.g. Bluetooth, ZigBee, ZWave, DECT, and the like); plain old telephone service, T1, and/or Voice over IP (VoIP) phone network; a cellular network; a proprietary network connection; and the like. Interconnect and/or network 120 may include multiple devices, translators, aggregators or concentrators that allow information on one type of network to reach devices on a different type of network. Appliance device 110 (e.g., thermostats and smoke detectors) may include wireless and/or wired network capability in addition to buttons and/or control panels. Various states of appliance device 110 may be communicated over the network to other networked devices or networked application servers. In addition, the network capability of appliance device 110 may be used to send panic signals.

In various embodiments, one or more appliance devices 110 are equipped to generate a panic message and transmit it over network/interconnect 120. After appropriate translation between different network protocols as needed, the panic message is received by one or more of security system 130, network-connected monitoring service 140, network application server 150, and local network application server/multi-function base unit 160.

When an emergency condition (e.g., presence of an intruder, fire, medical emergency, and the like) is perceived, the end user may activate the panic feature/mechanism associated with appliance device 110 (e.g., by pressing a button, striking appliance device 110 sufficiently to cause the embedded accelerometer to trigger, etc.). When the panic feature is activated, a panic signal is provided over the device's network connection using interconnect and/or network 120, and the panic signal notifies one or more of security system 130, network-connected monitoring service 140, network application server 150, and local network application server/multi-function base unit 160.

User communication device(s) 180 include at least one of a personal computer (PC), hand held computing system, telephone, mobile computing system, workstation, tablet, phablet, wearable, mobile phone, server, minicomputer, mainframe computer, or any other computing system. User communication device(s) 180 is described further in relation to computing system 800 in FIG. 8.

In some embodiments user communication device(s) 180 may include a web browser (or other software application) to communicate, for example, with a 911 service provider. For example, computing device 110 is a PC running a web browser inside (or outside) a commercial or residential structure. Additionally or alternatively, computing device 110 is a smart phone running a client (or other software application).

In various embodiments user communication device(s) 180 is used for telecommunications. For example, a user from his web or smartphone client upon could initiate a panic signal (and any emergency call signals that may result) as if it were originating from the structure, rather than from the user's smartphone client. Normally a 911 call from a cell phone is directed to a PSAP associated with the geographical location of the cell phone. According to some embodiments, a PSAP is a call center responsible for answering calls to an emergency telephone number for emergency services, such as police, fire, and ambulance services. For example, telephone operators may dispatch such emergency services. The present technology is capable of caller location for landline calls and mobile phone locations. For a user at a remote location who is notified of an emergency situation at the structure, dialing 911 from his cell phone could normally result in significant delay as he explains the situation to the PSAP serving the physical location of his smartphone (rather than that of the house that has been invaded), then waits for his call to be transferred to a PSAP in the area of his home and then takes the time to communicate the location of the house that is being invaded (which may even be in another state), and convinces the authorities to go to the structure.

In some embodiments, user communication device(s) 180 receives push notifications using a client (or other software application) running on user communication device(s) 180. For example, the push access protocol (PAP) (e.g., WAP-164 of the Wireless Application Protocol (WAP) suite from the Open Mobile Alliance) may be used.

System 100 of FIG. 1 further includes provisioning data 210. In some embodiments, at least one of security system 130, monitoring service 140, remote network application server 150, and local application server/multi-function base unit 160 may access provisioning data 210, for example by accessing (e.g., reading or writing to) it directly, by communicating with provisioning server 170, and the like. Provisioning data 210 stores information related to the end user/owner of appliance device 110.

Data stored by provisioning data 210 provided by security system 130, monitoring service 140, remote network application server 150, local application server/multi-function base unit 160, and/or provisioning server 170 may include at least one of usage information, user preferences information, and a service address of the structure (e.g., in which the appliance device is disposed). An operator of a processing entity (e.g., alarm service which remotely monitors the alarm system) may validate the service address and/or ensure the accuracy of the address information provided by the end user/owner of the appliance device. Incorrect or inaccurate information may result in sending first responders to the wrong location in the event of an emergency.

Figure 2:
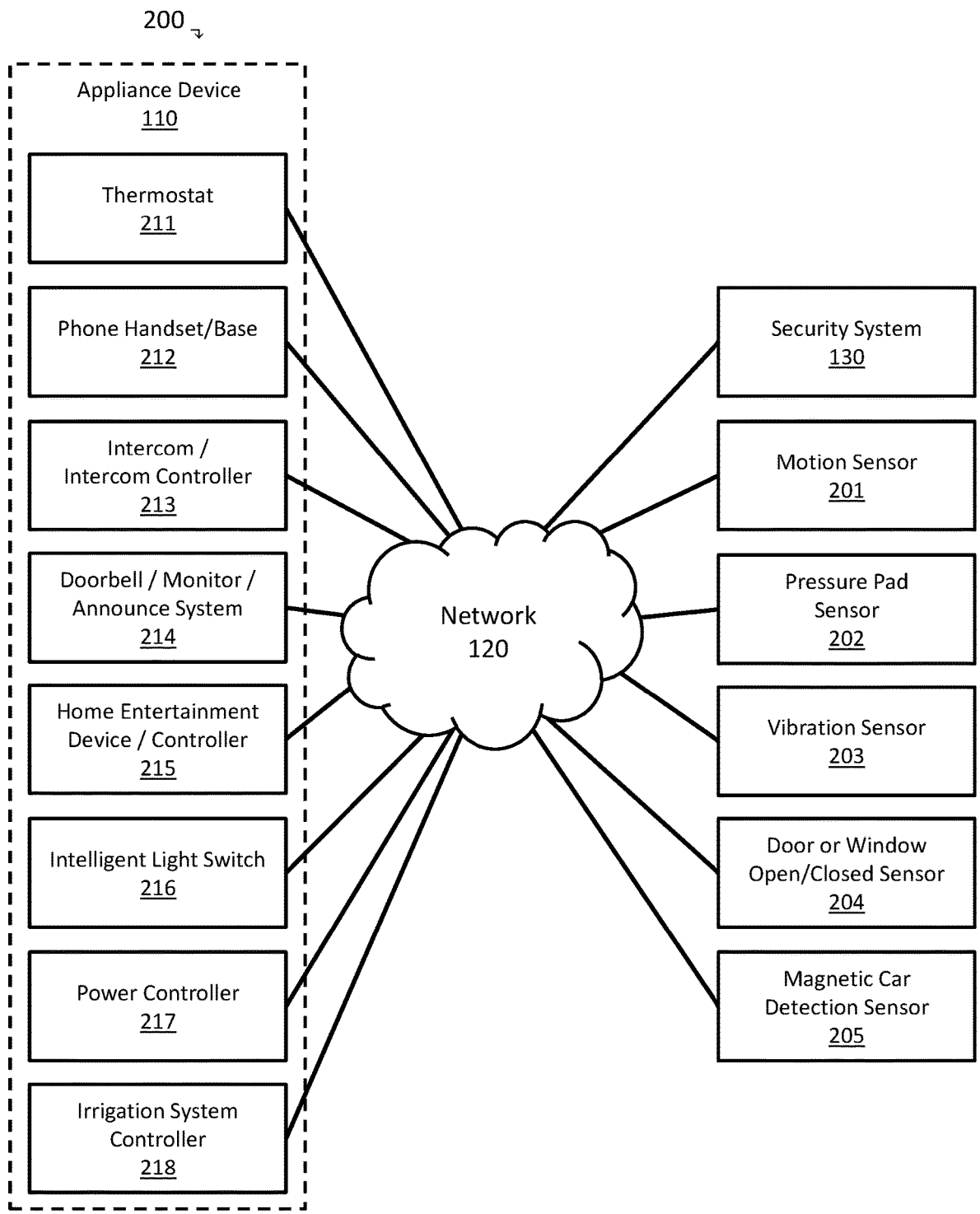
FIG. 2 is a simplified block diagram of an environment of a structure, in accordance with various embodiments.

FIG. 2 illustrates system 200 includes at least one sensor associated with security system 130, by way of example and not limitation, motion sensor 201, pressure sensitive pad 202, vibration sensor 203, door or window close/open switch 204, and magnetic sensor (e.g., may determine if a car is in the driveway or parking space) 205. Sensors 201-205 may communicate with home security system 130 using interconnect and/or network 120. Interconnect and/or network 120 may be wired and/or wireless, use at least one communications protocol, and use adaptors to interface different devices, media, and protocols. One or more of appliance devices 110 are communicatively coupled to interconnect and/or network 120. Appliance devices 110 may include (but are not limited to) thermostat 211, phone handset/base 212, intercom/intercom controller 213, door bell/monitor/announce system 214, home entertainment device/device controller 215, intelligent light switch 216, power controller 217, and an irrigation control system 218.

For example, security system 130 and sensors 201-205 communicate with one or more appliance devices 211-218 (110 in FIG. 1) using interconnect and/or network 120. In addition or alternatively, appliance devices 211-218 may query security system 130 and/or sensors 201-205. Information provided by security system 130 and/or sensors 201-205 may be used by appliance devices 211-218 to improve their performance, utility, and usability.

For example, thermostat 211 uses information provided by door or window close/open switch(s) 204 to determine when a window in the structure has been left open. To save energy, thermostat 211 may disable a climate control system associated with the structure while the windows are open.

For example, thermostat 211 uses the information provided by at least one of motion, pressure, and vibration sensors 201-203, and alarm system 130 (e.g., state information such as home, away, and the like) to determine occupancy and a state of the occupants (e.g., awake, sleeping, and the like). Using such information, thermostat 211 may adjust temperatures, enable or disable the climate control system, and the like. In some embodiments, thermostat 211 includes a (built-in) motion sensor (or similar sensor), and the state of the security system may be used in conjunction with information provided by the (built-in) motion sensor.

For example, at least one of phone handset/base 212, intercom/intercom controllers 213, door bell/monitor/announce system 214, and home entertainment device/controller 215 uses information provided by motion, pressure, or vibration sensors 201-203, and the state of the alarm system 130 (e.g., home, away, and the like) to determine occupancy and the state of the occupants (e.g., awake, sleeping, and the like). Using such information, at least one of phone handset/base 212, intercom/intercom controllers 213, door bell/monitor/announce system 214, and home entertainment device/controller 215 may be powered down when unused, be muted or silenced to ensure they do not disturb (sleeping) occupants, and the like. Additionally, more sophisticated actions are possible, for example, screening calls or doorbell presses selectively, allowing only very important (e.g., urgent) calls or doorbell presses.

For example, intelligent light switches 216 and power control modules 217 use information provided by at least one of motion, pressure, or vibration sensors 201-203, and the state of the alarm system 130 (e.g., at home, away, and the like) to determine occupancy and the state of the occupants (e.g., awake, sleeping, and the like). Using such information, intelligent light switches 216 and power control modules 217 may turn off power to unused devices, turn lights off, etc. In various embodiments, intelligent light switches 216 and power control modules 217 include a (built-in) motion sensor (or similar device), and the state of the security system may be used in conjunction with information provided by the (built-in) motion sensor.

For example, irrigation control system 218 uses information provided by magnetic sensor 205 to determine when a car has been left out overnight, and based on the determination suppress activation of an irrigation zone that would cause the car to become wet.

For example, irrigation control system 218 uses information provided by door or window close/open switch 204 to determine that a window near a sprinkler zone or garage door is open, and prevent that irrigation zone from running and spraying water into the structure.

As would be readily appreciated by one of ordinary skill in the art, different combinations and permutations of appliance devices 211-218 may use information provided by different combinations and permutations of sensors 201-205 to control operation of respective appliance devices 211-218. Moreover as would be readily appreciated by one of ordinary skill in the art, different appliance devices 110 (FIG. 1) and sensors associated with security system 130 (FIG. 1) may be used.

Figure 3:
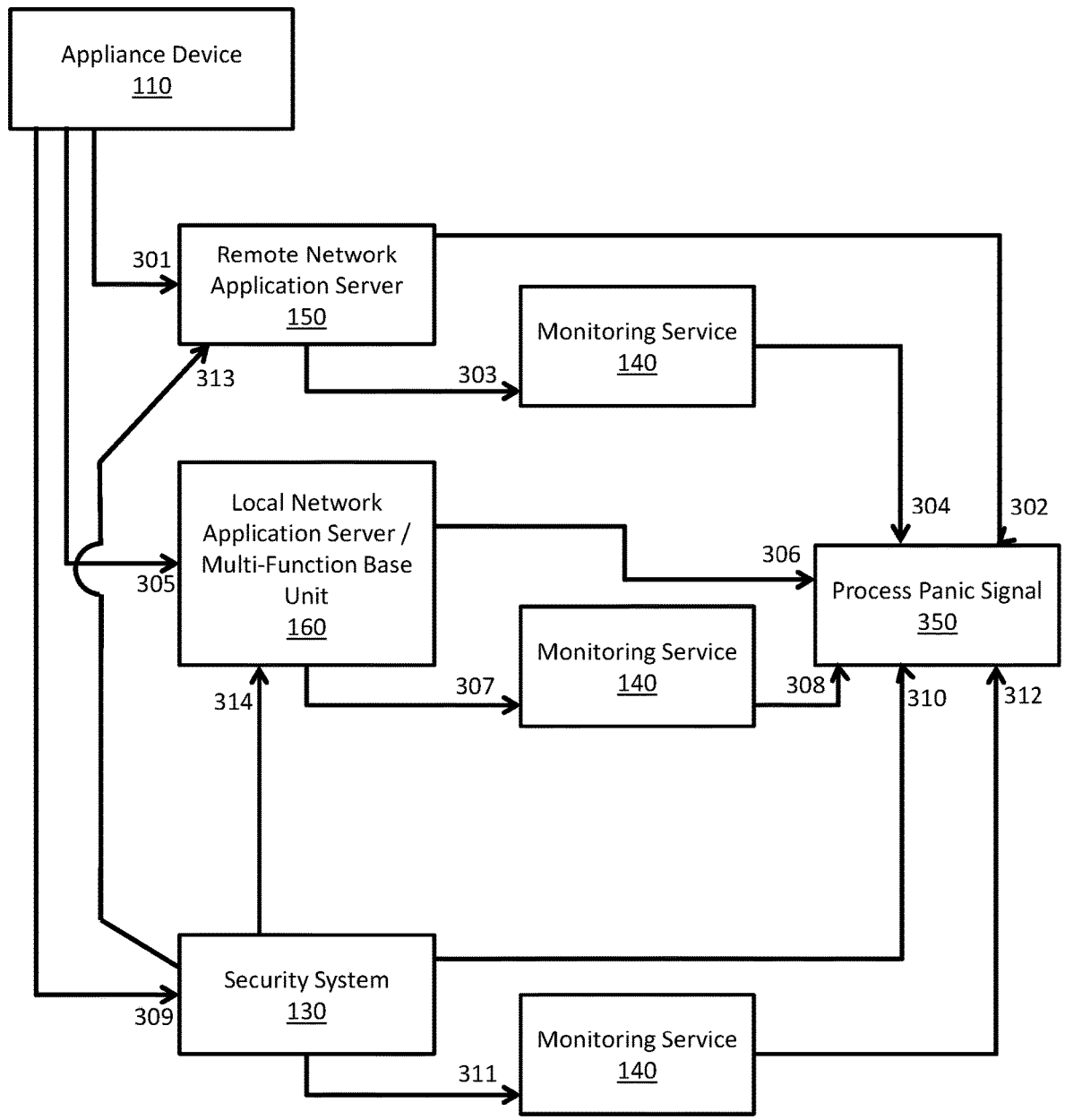
FIG. 3 is a simplified block diagram of a security system, according to several embodiments.

FIG. 3 illustrates processing paths for a panic button signal generated by appliance device 110 including security system 130, monitoring service 140, remote network application server 150, and local application server/multi-function base unit 160, according to some embodiments.

For example, remote network application server 150 receives the panic signal (or alert) 301 generated by appliance device 110. Remote network application server 150 may access provisioning information 210 (e.g., directly and/or using provisioning server 170, shown in FIG. 1). When the panic signal is received, remote application server 150 (serving as a processing entity) processes the panic signal at 350 as shown by path 302.

For example, remote network application server 150 receives the panic signal 301 and (instead of processing it directly) panic signal 303 is provided to monitoring service 140. Monitoring service 140 may access provisioning information 210 (e.g., directly and/or using provisioning server 170, shown in FIG. 1). When the panic signal 303 is received, the remote monitoring service (serving as the processing entity) processes the panic signal at 350 as shown by path 302.

For example, local network application server/multi-function base unit 160 receives panic signal 305 generated by appliance device 110. Local network application server/multi-function base unit 160 may access provisioning information 210 (e.g., directly and/or using provisioning server 170, shown in FIG. 1). When the panic signal 305 is received, local network application server/multi-function base unit 160 (serving as the processing entity) processes the panic signal at 350, as shown by path 306, and as described below. In various embodiments, local network application server/multi-function base unit 160 may provide other services in addition to monitoring for panic signals, for example, home automation services, home entertainment services, telephony services, and the like.

For example, local network application server/multi-function base unit 160 receives panic signal 305, and (instead of processing it directly) panic signal 307 is provided to monitoring service 140. Monitoring service 140 may access provisioning information 210 (e.g., directly and/or using provisioning server 170, shown in FIG. 1). When the panic signal 305 is received, remote monitoring service 140 (serving as the processing entity) processes the panic signal at 350, as shown by path 308.

For example, security system 130 receives panic signal 309 provided by appliance device 110. Security system 130 may access provisioning information 210 (e.g., directly and/or using provisioning server 170, shown in FIG. 1). When panic signal 309 is received, security system 103 (serving as the processing entity) processes the panic signal at 350, as shown by path 310.

For example, security system 130 receives panic signal 309, and (instead of processing it directly) panic signal 311 is provided to monitoring service 140. Monitoring service 140 may access provisioning information 210 (e.g., directly and/or using provisioning server 170, shown in FIG. 1). When panic signal 311 is received, remote monitoring service 140 (serving as the processing entity) processes the panic signal at 350, as shown by path 312.

For example, security system 130 receives panic signal 309, and (instead of processing it directly) panic signal 313 is provided to remote network application server 150. Remote network application server 150 may (serving as the processing entity) processes the panic signal at 350 directly as shown by path 302 and/or may provide panic signal 303 to monitoring service 140 for processing (e.g., monitoring service serves as the processing entity) at 350, as shown by path 304. Remote application server 150 and/or monitoring service 140 may access provisioning information 210 (e.g., directly and/or using provisioning server 170, shown in FIG. 1).

For example, security system 130 receives the panic signal 309, and (instead of processing it directly) panic signal 314 is provided to local network application server/multi-function base unit 160. Local network application server/multi-function base unit 160 (serving as the processing entity) may processes the panic signal at 350 directly, as shown by path 306, and/or provide panic signal 307 to monitoring service 140 for processing (e.g., monitoring service serves as the processing entity) at 350, as shown by path 308. Remote application server 150 or monitoring service 140 may access provisioning information 210 (e.g., directly and/or using provisioning server 170, shown in FIG. 1).

For example, security system 130 receives panic signal 309 from appliance device 110, and panic signal 313 is provided to remote network application server 150 and/or panic signal 314 is provided to local network application server/multi-function base unit 160. Remote application server 150 and/or local application server 160 may include provisioning information and/or receive information, relating to the end user/owner of appliance device 110 issuing the panic signal, from provisioning server 170 (not shown in FIG. 3). When panic signal 313 and/or 314 is received, remote application server 150 and/or local application server 160 (respectively, serving as the processing entity) go on to processes the panic signal at 350.

Figure 4:
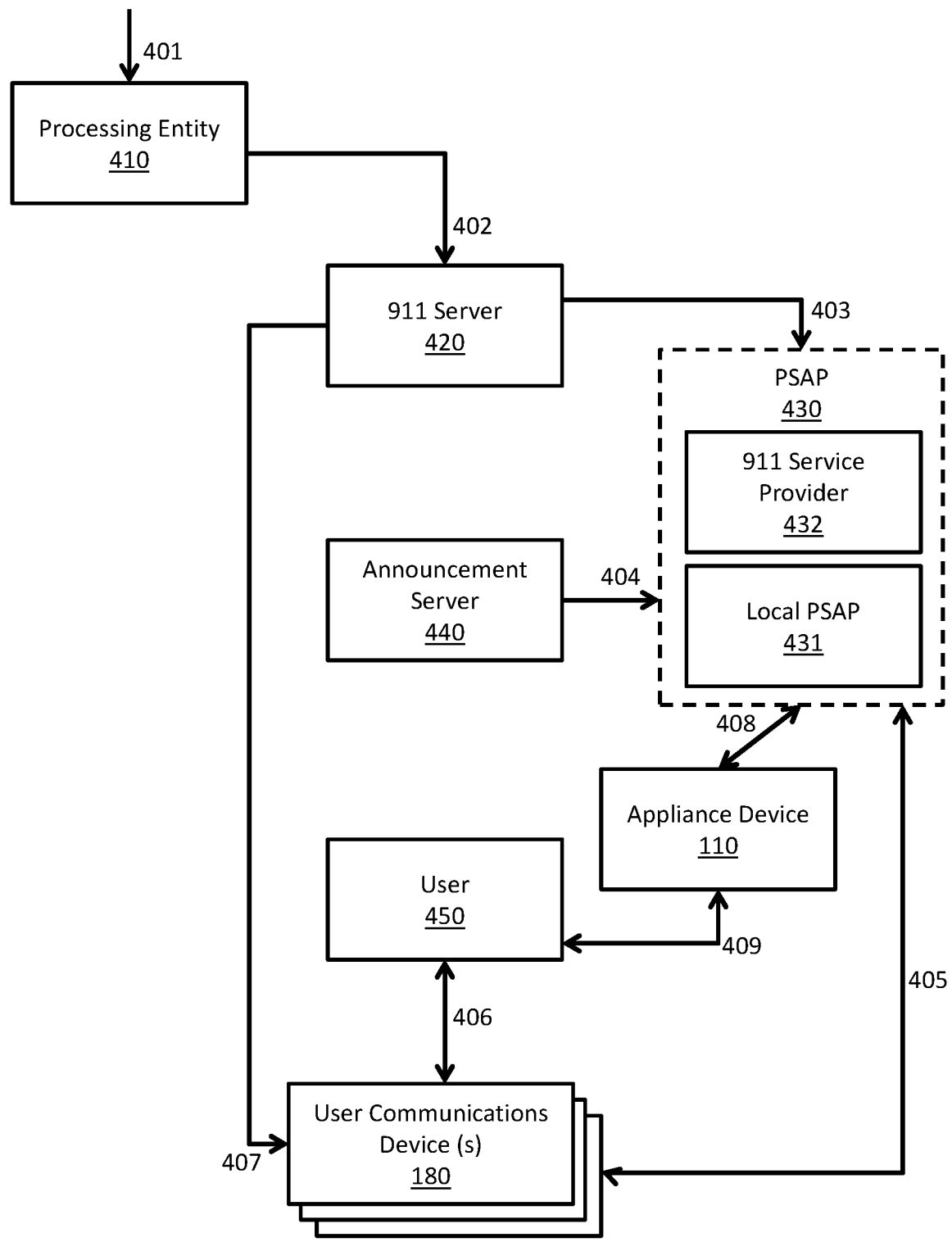
FIG. 4 is a simplified block diagram of processing paths for a panic button signal, in accordance with some embodiments.

FIG. 4 illustrates processing paths for a panic button signal 401 received by processing entity 410. Processing entity 410 may be one or more of security system 130, monitoring service 140, remote network application server 150, and local network application server/multi-function base unit 160 (shown in FIG. 3), or be another entity receiving signal 401 from one of security system 130, monitoring service 140, remote network application server 150, and local network application server/multi-function base unit 160. In response to receiving panic signal 401 using network 120 (and optionally at least one of security system 130, remote network application server 150, and local application server/multi-function base unit 160, shown in FIG. 1), processing entity 410 may instruct 402 a 911 (or other emergency telephone number) server 420 to initiate a call. Call 403 is placed to the Public Safety Answering Point (PSAP) 430 associated with the physical address where appliance device 110 is located. Optionally, one or more intermediary 911 service providers 432 are used to facilitate the connection to the local PSAP 431. Call 403 may be completed using at least one of plain old telephone service, T1, VoIP protocols such as session initiation protocol (SIP), cellular signaling, and the like.

For example, when call 403 is terminated to local PSAP 431, call 403 is connected to announcement server 440, and announcement server 440 notifies 404 a PSAP operator associated with PSAP 430 that (automated) call 403 was initiated by a person at the provisioned service address.

For example, when call 403 is terminated to local PSAP 430, call 403 is connected 405 (directly) to provisioned user 450 through 406 a communication device or devices 180 using a call initiated by the processing entity to the user's preferred phone number; or using some other interactive communications mechanism (SMS, IM, video, smartphone application, or other communications mechanism) supported by communication device(s) 180 of 406 user 450.

For example, when call 403 is terminated to local PSAP 430, call 403 is connected 404 to announcement server 440 and additional calls 405 are placed sequentially or concurrently to a plurality of alternate telephone numbers associated with communication device(s) 180 of 406 user 450; or using some other interactive communications mechanism 406 (e.g., SMS, IM, video, smartphone application, or other communications mechanism) supported by communication device(s) 180 of user 450. The PSAP operator can talk to a live human to handle the emergent situation if the user is available, but still receives the notification via the server immediately even if the user does not answer.

For example, when call 403 is terminated to local PSAP 430, call 403 is connected 408 directly to provisioned user 450 using 409 consumer appliance device 110 in the structure with capability for voice, video, and/or instant messaging (IM) communication.

For example, when call 403 is terminated to local PSAP 430, call 403 is connected 404 to announcement server 440 while the system places additional calls 408 to telephone numbers associated with appliance device 110 of 409 user 450 in the structure with capability for voice, video, IM, or other form of communication. The PSAP operator can talk to a live human to handle the emergent situation if the user is available, but still receives the notification via the server immediately or if the user does not answer.

Figure 5:
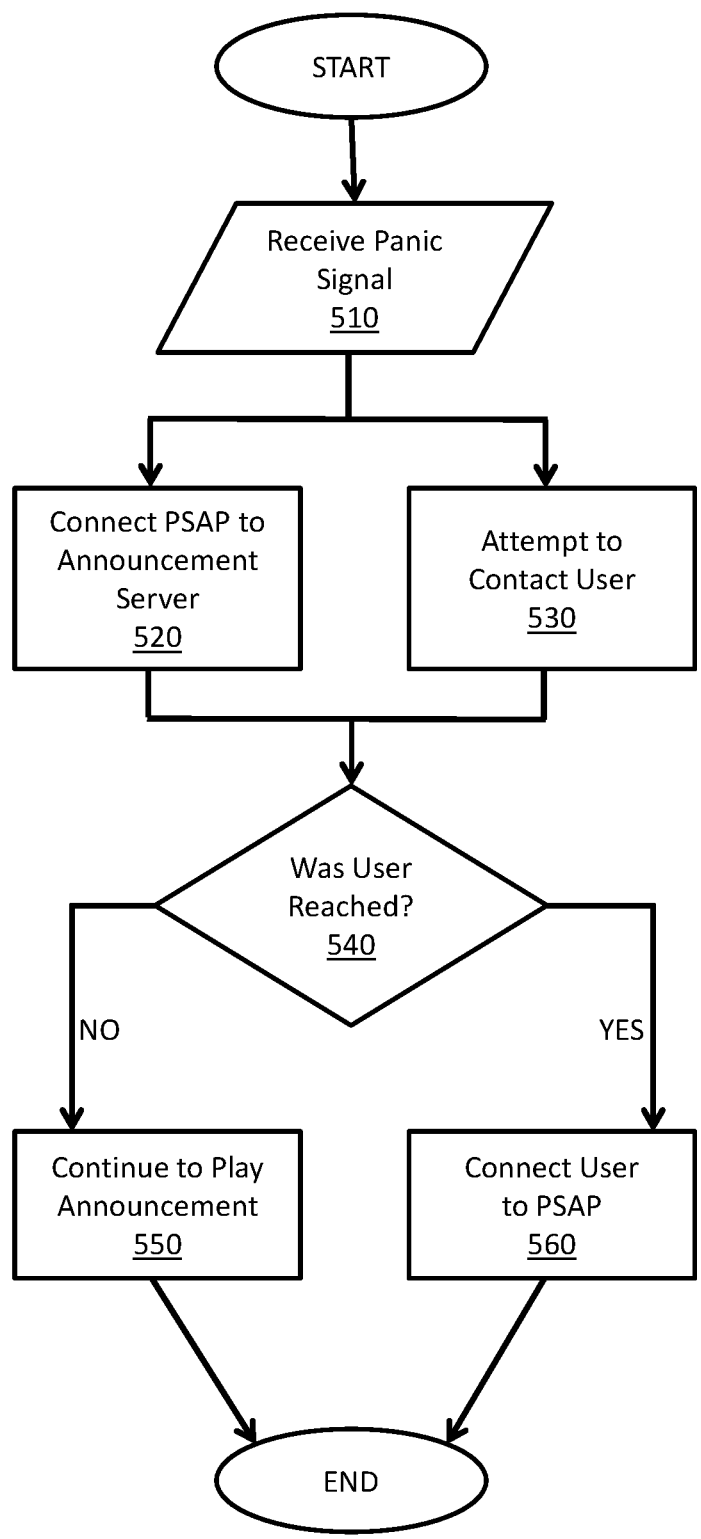
FIG. 5 is a simplified flow diagram of processing a panic button signal, according to various embodiments.

FIG. 5 depicts a simplified flow diagram for processing entity 410 processing a panic signal. An incoming panic signal is received (e.g., by processing entity 410) at step 510. At step 520, a call to the PSAP 430 is initiated, connecting an operator at PSAP 430 to announcement server 440, and in response to being connected an emergency announcement with the provisioned location information is provided. Concurrently at step 530 user 450 is contacted using one or more user communications devices 180. At step 540, whether the user has been reached through an interactive mechanism (e.g., voice, video, SMS, other interactive communications software, etc.) is determined. When the user is not reached within a predetermined period of time, the announcement continues to play for the PSAP operator at step 550. When the user is reached, the user is connected to the PSAP operator at step 560.

For example, processing entity 410, in response to receiving panic signal 401 through network 120 (and optionally at least one of security system 130, remote network application server 150, and local application server/multi-function base unit 160, shown in FIG. 1) sends a notification 407 to user 450 through 406 user communication device 180 (e.g., via a smartphone app, push notification, SMS message, phone call, email, or other mechanism). In this way, the user has an opportunity (e.g., with a time limit or password to ensure the user is not under duress) to prevent the 911 call from being placed in the case of a false alarm. When the user is unreachable or confirms the panic signal relates to a legitimate security event, the 911 call is placed to PSAP 430 as described above in relation to steps 403 and 404 of FIG. 4.

Figure 6:
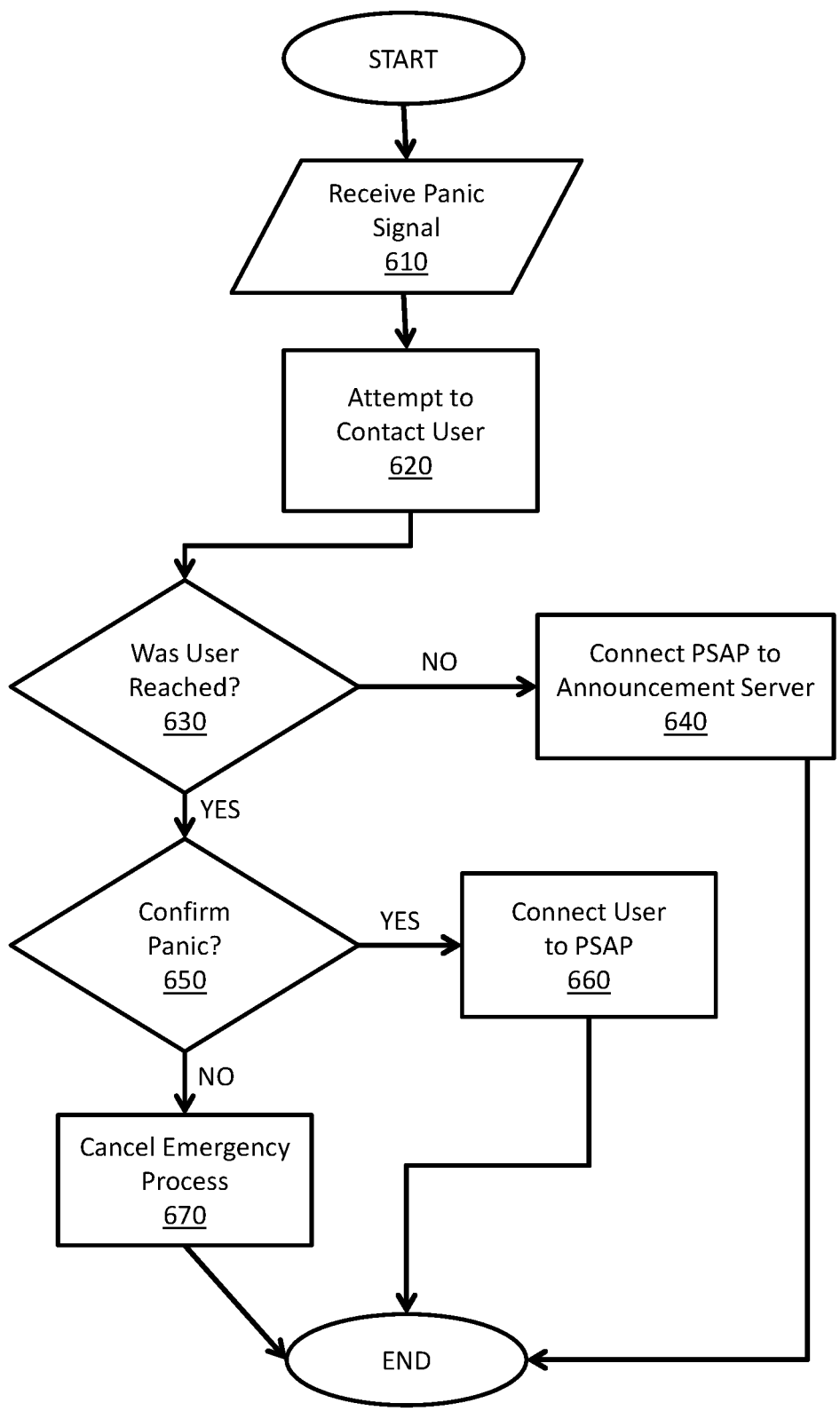
FIG. 6 is a simplified flow diagram of contacting a user, in accordance with several embodiments.

FIG. 6 shows a simplified flow diagram for processing entity 410 processing a panic signal. An incoming panic signal is received (e.g., by the processing entity) at step 610. At step 620 user 450 (not shown) is contacted using one or more of user communications devices 180 and appliance device 110 with voice, video, IM, or other communication capabilities. At step 630, the system waits a predetermined time to see if the user has been reached. If not, at step 640 a call is initiated to PSAP 430, connecting PSAP 430 to an announcement server 440 and playing the emergency announcement with the provisioned location information. In response to the user being reached, a mechanism is used to determine if the panic event is legitimate and if the user is under duress, at step 650. If the panic signal relates to a legitimate security event and the user is under duress, the processing entity initiates a call to PSAP 430 and the user is connected directly to PSAP 430, at step 660. In response to the user indicating the panic signal was a false alarm at step 650, the emergency process is canceled at step 670.

Providers of network-connected devices may also provide a remote software control mechanism, for example, smartphone application, web access, telephone touch-tone control, and the like. Such remote software control mechanisms may be useful for monitoring and controlling the appliance device 110 remotely (e.g., from the office, while on vacation, and the like). In various embodiments, the additional panic-button functionality of the consumer appliance device is also available through the remote software control mechanism. For example, the emergency infrastructure described above is used to allow such remote software control mechanisms to initiate emergency calls that appear as if they came from the service address of the monitored device (provisioned location), rather than the physical location of the smartphone running the application. The user 450 may be connected to and communicating with emergency services (e.g., PSAP) from a remote location using one or more user communications device (s), but it will appear to the emergency services personnel that the communication is originating from the structure.

For example, the remote software control mechanism may have the capability of issuing panic signals from the location of a smartphone (not illustrated in FIG. 6; e.g., located using at least one of GPS coordinates, WiFi location, cellular triangulation, and the like), and/or from the location of appliance device 110 being controlled (provisioned location). In this way, panic capabilities may be used to indicate a problem at the site of the consumer appliance device and/or at user's location.

A service connecting a caller to a PSAP with proper address information may be provided for a fee on a monthly basis. Such an expense can be several cents per month. Further, some municipalities charge a dollar or more per month in taxes/service fees for each customer of a telephone service capable of dialing 911. Given the potentially long operating life of appliance device 110 (e.g., a thermostat, remote control, and similar appliance in the home), the relatively low likelihood of an emergency event in any particular month, and the fact that appliance device 110 does not provide a regular phone service, this prohibitive expense should be avoided. In some embodiments, provisioning of the address for the triggering device is not done until an actual emergency event is established. Since provisioning may be performed electronically, such that there is no perceptible delay in the handling of a 911 call and costs associated with providing a phone number and ongoing 911 service, and associated government taxes/fees are avoided until the service is needed.

Figure 7:
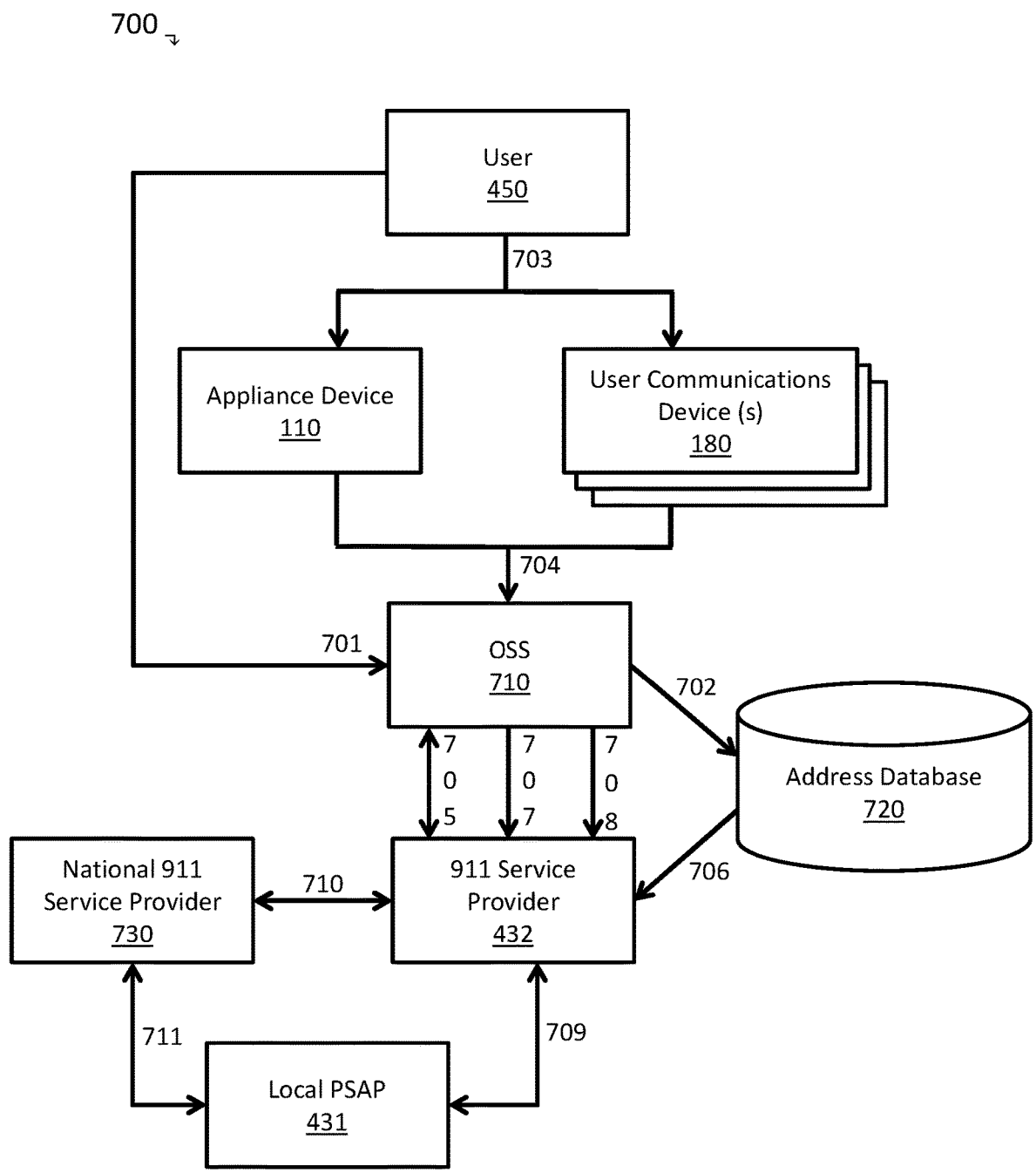
FIG. 7 is another simplified flow diagram of contacting a user, according to some embodiments of the present invention.

FIG. 7 illustrates a simplified block diagram for a system 700 for provisioning a user and his or her location on an as-needed basis with a 911 service provider.

Provisioning of addresses with a 911 service provider 432 (FIG. 4) may be provided using an application programming interface (API) used by the network operator's (e.g., organization producing appliance device 110) operations support system (OSS) 710 to communicate with the 911 service provider. When an end user 450 initially activates their consumer appliance device, they provide their service address as part of the activation process at step 701. OSS 710 may perform a variety of checks of the service address to ensure that it is valid and then stores it in address database 720, for future provisioning at step 702.

A panic signal may be triggered in response to user 450 pressing a button, shaking, striking, etc. the consumer appliance device 110, selecting an option via remote software control mechanism accessed by a user communication device 180, and the like, at path 703. When the end user generates their first panic signal, the panic signal is sent to the appliance device's OSS 710, at step 704. When this initial panic signal leading to their first call to 911 is received, an emergency call signal is sent to the 911 server which determines if the user's device has already been provisioned with 911 services at step 705. When the user is not provisioned, OSS server 710 retrieves a previously validated address from the database 720 at step 706 and submits the previously validated address to the 911 service provider's API at step 707.

In response to provisioning being confirmed, a 911 server portion of OSS 710 may send a control emergency call signal 708 to the 911 service provider asking it to initiate a 911 call. The 911 service provider, having the provisioned address of the device initiating the call, presents the provisional address 709 to the appropriate PSAP 431, and connects the call. The 911 server determines the appropriate call handling for the origination side of the call (e.g., connecting the call to an announcement server, to a user's pre-selected phone number, and the like).

When the provisioning fails, the address proves to be invalid (in spite of having been previously validated), etc., the 911 service provider may pass the call to a national center 730 at step 710 for proper routing to the appropriate PSAP at step 711.

Figure 8:
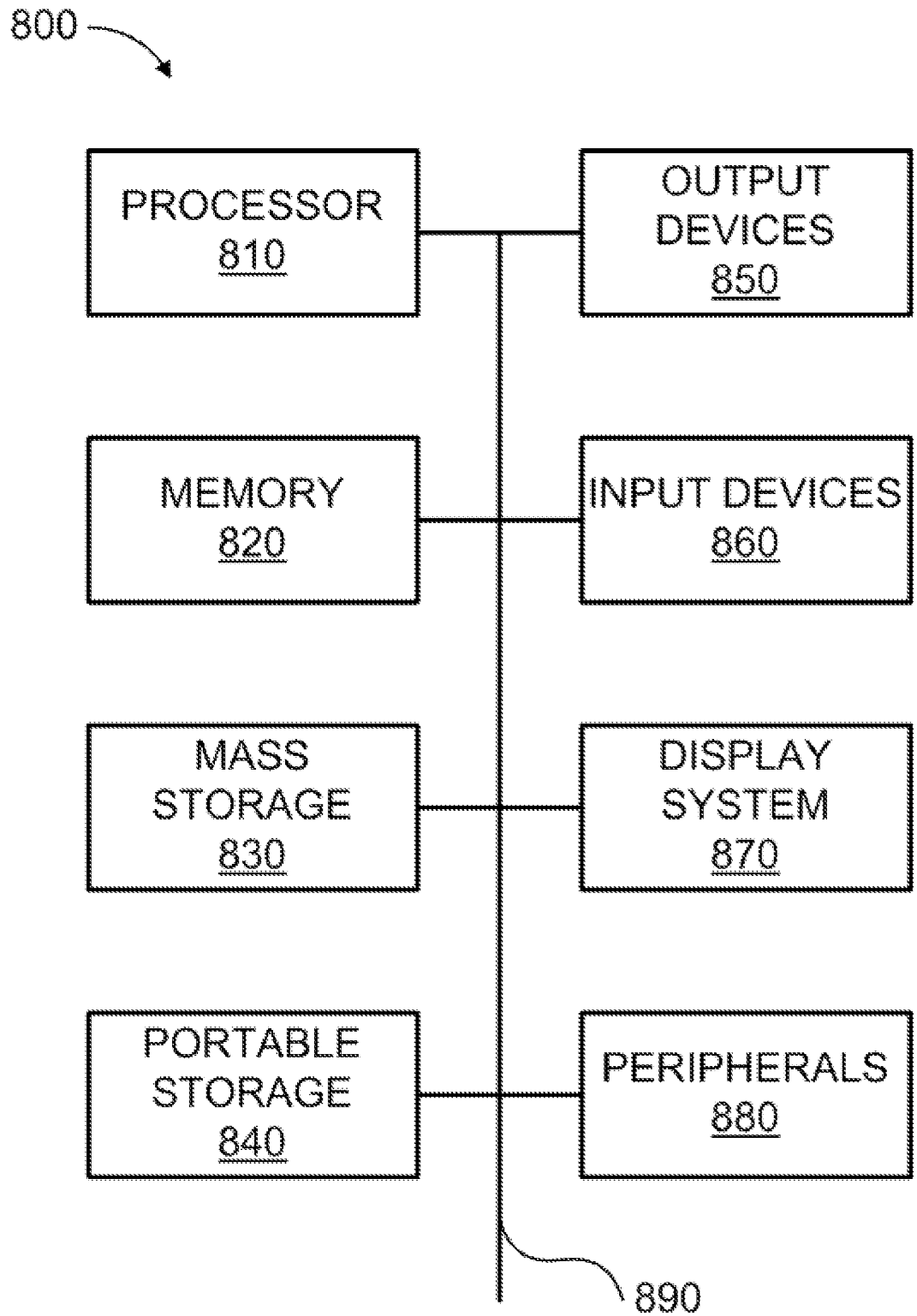
FIG. 8 is a simplified block diagram for a computing system according to some embodiments.

FIG. 8 illustrates an exemplary computing system 800 that is used to implement some embodiments of the present systems and methods. The computing system 800 of FIG. 8 is implemented in the contexts of the likes of computing devices, networks, webservers, databases, or combinations thereof. The computing device 800 of FIG. 8 includes a processor 810 and memory 820. Memory 820 stores, in part, instructions and data for execution by processor 810. Memory 820 stores the executable code when in operation.

The computing system 800 of FIG. 8 further includes a mass storage 830, portable storage 840, output devices 850, input devices 860, a display system 870, and peripherals 880. The components shown in FIG. 8 are depicted as being connected via a single bus 890. The components are connected through one or more data transport means. Processor 810 and memory 820 may be connected via a local microprocessor bus, and the mass storage 830, peripherals 880, portable storage 840, and display system 870 may be connected via one or more input/output (I/O) buses.

Mass storage 830, which may be implemented with a magnetic disk drive, solid-state drive (SSD), or an optical disk drive, is a non-volatile storage device for storing data and instructions for use by processor 810. Mass storage 830 can store the system software for implementing embodiments of the present technology for purposes of loading that software into memory 820.

Portable storage 840 operates in conjunction with a portable non-volatile storage medium, such as a floppy disk, compact disk or digital video disc, to input and output data and code to and from the computing system 800 of FIG. 8. The system software for implementing embodiments of the present technology may be stored on such a portable medium and input to the computing system 800 via the portable storage 840.

Input devices 860 provide a portion of a user interface. Input devices 860 may include an alphanumeric keypad, such as a keyboard, for inputting alphanumeric and other information, or a pointing device, such as a mouse, a trackball, stylus, or cursor direction keys. Additionally, the system 800 as shown in FIG. 8 includes output devices 850. Suitable output devices include speakers, printers, network interfaces, and monitors.

Display system 870 includes a liquid crystal display (LCD) or other suitable display device. Display system 870 receives textual and graphical information, and processes the information for output to the display device.

Peripherals 880 include any type of computer support device to add additional functionality to the computing system. Peripherals 880 may include a modem or a router.

The components contained in the computing system 800 of FIG. 8 are those typically found in computing systems that may be suitable for use with embodiments of the present technology and are intended to represent a broad category of such computer components that are well known in the art. Thus, the computing system 800 can be a personal computer, hand held computing system, telephone, mobile phone, smartphone, tablet, phablet, wearable technology, mobile computing system, workstation, server, minicomputer, mainframe computer, or any other computing system. The computer can also include different bus configurations, networked platforms, multi-processor platforms, etc. Various operating systems can be used including UNIX, LINUX, WINDOWS, MACINTOSH OS, IOS, ANDROID, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 800 may be implemented as a cloud-based computing environment, such as a virtual machine operating within a computing cloud. In other embodiments, the computing system 800 may itself include a cloud-based computing environment, where the functionalities of the computing system 800 are executed in a distributed fashion. Thus, the computing system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 800, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present technology has been described in connection with a series of preferred embodiment, these descriptions are not intended to limit the scope of the technology to the particular forms set forth herein. It will be further understood that the methods of the technology are not necessarily limited to the discrete steps or the order of the steps described. To the contrary, the present descriptions are intended to cover such alternatives, modifications, and equivalents as may be included within the spirit and scope of the technology as defined by the appended claims and otherwise appreciated by one of ordinary skill in the art.

What is claimed is:

1. A method for provisioning an appliance device comprising:
   receiving a service address, user preferences information, a 911 server address, and another emergency telephone number server address from a user associated with the appliance device, the appliance device comprising a phone;
   generating a validation result for the service address and the another emergency telephone number server address;
   storing the service address, the 911 server address, the another emergency telephone number server address, and the validation result for the service address and the another emergency telephone number server address;
   receiving a panic signal based upon the user dialing 911 on the phone;
   providing, based on the validation result, the service address to an emergency telephone number service provider for provisioning;
   transmitting, based on a provisioning result, the service address to a public safety access point (PSAP) associated with the service address;
   connecting an operator to an announcement server with the PSAP; and
   transmitting an emergency announcement upon connecting the operator.

2. The method of claim 1, wherein the emergency telephone number service provider is a 911 service provider.

3. The method of claim 1 wherein the phone is a mobile phone or a smartphone.

4. The method of claim 1, wherein the phone is serviced by one of plain old telephone service, T1, and VoIP protocols.

5. The method of claim 1, wherein the phone is an IP phone.

6. The method of claim 1, further comprising:
   sending an emergency call signal to a 911 server; and
   determining, by the 911 server, whether the phone has already been provisioned with 911 services.

7. The method of claim 6, further comprising:
   upon a determination that the phone is not provisioned for 911 services, retrieving the previously validated service address from an address database coupled to a 911 service provider; and
   submitting the previously validated service address to the 911 service provider.

8. The method of claim 1, wherein the emergency announcement further comprises the service address and the another emergency telephone number server address.

9. The method of claim 8, wherein the emergency announcement further comprises the user preferences information.

10. A system for intelligent control of an appliance device, the system comprising:
    a processor; and
    a memory coupled to the processor, the memory storing instructions executable by the processor to perform a method comprising:
    receiving a service address, user preferences information, a 911 server address, and another emergency telephone number server address from a user associated with the appliance device, the appliance device comprising a phone;
    generating a validation result for the service address and the another emergency telephone number server address;
    storing the validated service address, the 911 server address, the another emergency telephone number server address, and the validation result for the service address and the another emergency telephone number server address;
    receiving a panic signal based upon the user dialing 911 on the phone;
    providing, based on the validation result, the service address to an emergency telephone number service provider for provisioning;
    transmitting, based on a provisioning result, the service address to a public safety access point (PSAP) associated with the service address;
    connecting an operator to an announcement server with the PSAP; and
    transmitting an emergency announcement upon connecting the operator.

11. The system of claim 10, wherein the emergency telephone number service provider is a 911 service provider.

12. The system of claim 10, wherein the phone is a mobile phone or a smart phone.

13. The system of claim 10, wherein the phone is serviced by one of plain old telephone service, T1, and VoIP protocols.

14. The system of claim 10, wherein the phone is an IP phone.

15. The system of claim 10, further comprising:
    sending an emergency call signal to a 911 server; and
    determining, by the 911 server, whether the phone has already been provisioned with 911 services.

16. The system of claim 15, further comprising:
    upon a determination that the phone is not provisioned for 911 services, retrieving a previously validated service address from an address database coupled to a 911 service provider; and
    submitting the previously validated service address to the 911 service provider.

17. The system of claim 10, wherein the emergency announcement further comprises the service address and the another emergency telephone number server address.

18. The system of claim 17, wherein the emergency announcement further comprises the user preferences information.

* * * * *